United States Patent [19]
Kusaka et al.

[11] Patent Number: 5,179,407
[45] Date of Patent: Jan. 12, 1993

[54] AUTOMATIC FOCUSING DEVICE

[75] Inventors: Yosuke Kusaka, Yokohama; Toshimi Watanabe, Tokyo; Ken Utagawa, Yokohama, all of Japan

[73] Assignee: Nikon Corporation, Tokyo, Japan

[21] Appl. No.: 850,164

[22] Filed: Mar. 13, 1992

Related U.S. Application Data

[63] Continuation of Ser. No. 539,435, Jun. 15, 1990, abandoned.

[30] Foreign Application Priority Data

Jun. 19, 1989 [JP] Japan .................. 1-156206
Sep. 11, 1989 [JP] Japan .................. 1-234997
Sep. 11, 1989 [JP] Japan .................. 1-234998
Mar. 6, 1990 [JP] Japan .................. 2-54374

[51] Int. Cl.$^5$ .................................. G03B 13/36
[52] U.S. Cl. .................................. 354/400; 354/402
[58] Field of Search .................. 354/400, 402-409

[56] References Cited

U.S. PATENT DOCUMENTS 4,931,820 6/1990 Matsuzun et al. .................. 354/402

FOREIGN PATENT DOCUMENTS 60-214325 10/1985 Japan .
63-148218 6/1988 Japan .

Primary Examiner—Russell E. Adams
Attorney, Agent, or Firm—Shapiro and Shapiro

[57] ABSTRACT

An automatic focus device for a camera which comprises a phototaking lens for forming the image of an object on a predetermined plane, a focus detection device for detecting the amount of defocus of the image plane of the phototaking lens with respect to the predetermined plane, a lens position detecting device for detecting the position of the phototaking lens, an in-focus lens position determining device for determining an in-focus lens position to which the phototaking lens is to be focused, from said defocus amount and said lens position, a lens movement pattern memory device for storing, as lens movement pattern information, the relationship between the lens position and time for focusing the phototaking lens to a particular moving object and a lens drive controller device for controlling the lens position in such a manner that the movement of the phototaking lens as a function of time coincides with the lens movement pattern information, and compensating the position-time relationship of the phototaking lens and the lens movement pattern information, based on the in-focus lens position.

30 Claims, 32 Drawing Sheets

FIG. 6

| ADDRESS | (TIME t) | CONTENT (LENS POSITION) |
|---|---|---|
| X | 0 | $Z_0$ |
| X + 1 | $1 \times \Delta T$ | $Z_1$ |
| X + 2 | $2 \times \Delta T$ | $Z_2$ |
| ⋮ | ⋮ | ⋮ |
| X + n | $n \times \Delta T$ | $Z_n$ |
| X + n + 1 | $(n+1) \times \Delta T$ | $Z_{n+1}$ |
| ⋮ | ⋮ | ⋮ |

FIG. 19A

| ADDRESS | TIME t |
|---|---|
| Y | t0 |
| Y + 1 | t1 |
| Y + 2 | t2 |
| ⋮ | ⋮ |
| Y + n − 1 | tn − 1 |
| Y + n | tn |
| ⋮ | ⋮ |

FIG. 19B

| ADDRESS | CONTENT LENS POSITION |
|---|---|
| W | Z0 |
| W + 1 | Z1 |
| W + 2 | Z2 |
| ⋮ | ⋮ |
| W + n − 1 | Zn − 1 |
| W + n | Zn |
| ⋮ | ⋮ |

FIG. 21

| ADDRESS | (TIME t) | CONTENT LENS POSITION |
|---|---|---|
| X | (0) | F(0) |
| X + 1 | $(1 \times \Delta T)$ | $F(1 \times \Delta T)$ |
| X + 2 | $(2 \times \Delta T)$ | $F(2 \times \Delta T)$ |
| ⋮ | ⋮ | ⋮ |
| X + n | $(n \times \Delta T)$ | $F(n \times \Delta T)$ |
| X + n + 1 | $((n+1) \times \Delta T)$ | $F((n+1) \times \Delta T)$ |
| ⋮ | ⋮ | ⋮ |

FIG. 22

| ADDRESS | (LENS POSITION Z) | CONTENT LENS POSITION |
|---|---|---|
| X | ( 0 ) | G ( 0 ) |
| X + 1 | ( 1 × ΔZ ) | G ( 1 × ΔZ ) |
| X + 2 | ( 2 × ΔZ ) | G ( 2 × ΔZ ) |
| ⋮ | ⋮ | ⋮ |
| X + n | ( n × ΔZ ) | G ( n × ΔZ ) |
| X + n + 1 | ( (n + 1) × ΔZ ) | G ( (n + 1) × ΔZ ) |
| ⋮ | ⋮ | ⋮ |

FIG. 23A

| ADDRESS | TIME t |
|---|---|
| V | t0 |
| V + 1 | t1 |
| V + 2 | t2 |
| ⋮ | ⋮ |
| V + K - 1 | tk - 1 |
| V + K | tk |
| ⋮ | ⋮ |

FIG. 23B

| ADDRESS | CONTENT LENS POSITION |
|---|---|
| U | Z0 |
| U + 1 | Z1 |
| U + 2 | Z2 |
| ⋮ | ⋮ |
| U + K - 1 | Zk - 1 |
| U + K | Zk |
| ⋮ | ⋮ |

SHIFTING DISTANCE FOR FOCUSING FROM ∞

SHIFTING DISTANCE FOR FOCUSING FROM ∞

SHIFTING DISTANCE FOR FOCUSING FROM ∞

AUTOMATIC FOCUSING DEVICE

This is a continuation of application Ser. No. 539,435 filed Jun. 15, 1990, now abandoned.

BACKGROUND OF THE INVENTION

1. Field of the Invention

The present invention relates to an automatic focusing device, adapted for use in a camera or the like, and capable of automatic focusing to a moving object.

2. Related Background Art

For driving a phototaking lens for focusing to a moving object without delay, there is already known a technology called moving object prediction or prediction drive.

As an example, in an automatic focusing device disclosed in the Japanese Laid-Open Patent Appln. No. 60-214325 of the present assignee, the phototaking lens is driven by prediction of future lens position, based of the latest defocus amount and plural defocus amounts in the past obtained from focus detecting means.

Such an automatic focusing device, for predicting the future lens position based on the latest defocus amount and the plural past defocus amounts, is capable of providing a highly precise prediction and effecting exact lens driving if the lens position varies substantially linearly in time for the moving object. However, the prediction cannot be conducted accurately if the lens position does not vary linearly, so that the lens may show overrun or underrun with respect to the real in-focus position.

For example, if an automobile moving at a constant speed as shown in FIG. 1 is followed by a camera at a shortest distance S, the focusing lens ideally shows a movement in time indicated by a solid line L in FIG. 2.

FIG. 2 shows the lens position Z(t) in the ordinate as the lens shifts from a position corresponding to the infinite object distance, as a function of time t in the abscissa, wherein a lens position Zs corresponds to said closest position S.

FIG. 3 shows the result of linear prediction in a conventional device, for the object shown in FIG. 1 providing the lens shift pattern shown in FIG. 2.

In FIG. 3, a broken line M indicates the lens position as a function of time under control by the conventional technology. As the solid line L indicating the ideal pattern shows rapid change at the lens positions Z(t1) and Z(t2), the prediction based on the past data in the conventional device results in lens overrun.

Particularly when the charge accumulating time of the sensor employed for focus detection becomes long due to the low brightness of the object, or when the exposure operation is inserted between the focus detecting operations, the interval between the detections of defocus amount becomes longer, whereby the accuracy of prediction is further deteriorated. Consequently the overrun becomes more conspicuous, and, in the worst case, the focus detection becomes impossible because the amount of movement of the object becomes too large in said interval, whereby the proper lens drive becomes impossible.

There is also known an automatic focusing device for constantly focusing, on the photographic film, the image of an object moving with a particular pattern. Such an automatic focusing device is capable of memorizing the locus of phototaking lens positions for maintaining the focused state for said particular moving pattern of the object and driving the lens according to the memorized locus.

Such known automatic focusing device, however, is subject to certain drawbacks.

In such lens driving method according to the memorized locus of lens positions, there has not been paid particular consideration to the method of entry of the memorized locus of lens positions. If the geometrical conditions (object distance, speed etc.) of the object movement are known, the locus information indicating the lens position for focusing to the moving object as a function of time can be theoretically calculated. However, as the actual object does not necessarily move exactly according to such conditions, there may result a focus error even if the phototaking lens is driven according to thus calculated locus information.

As an example, when an automobile linearly moves toward a camera, as shown in FIG. 4, with a constant speed V and a shortest distance S to the camera, the locus Z of lens position from the initial distance P can be represented as follows:

$$Z = (D/2 - f) - \sqrt{(D/2 - f)^2 - f^2}$$

wherein $$D = \sqrt{(P - V \times t)^2 + S^2} \quad (1)$$

In the equation (1), f is the focal length of the phototaking lens, t is the time, and the lens position Z is derived, from known lens equations for a single lens, taking the lens position focus to the infinite distance as zero.

However, if the actual object has a closest distance Sr and a speed Vr, there will result an error between the lens locus Z obtained from the equation (1) and the actual locus Zr obtained by putting Sr, Vr into the equation (1), and the obtained image becomes out of focus if said error is large.

The conventional automatic focusing device discriminates whether the object is moving, based on plural defocus amounts obtained in the past from focus detecting means, then predicts the movement of the object based on the past plural defocus amounts and corrects the defocus amount of the focus detecting means so as to follow the movement of the object. Such technology, for example, as disclosed in the Japanese Laid-Open Patent Appln. No. 63-148218 of the present assignee, serves to maintain the in-focus state even for a moving object.

However, since such conventional technology effects the lens drive based on the past plural defocus amounts, there may result an erroneous lens drive by an error in the detected defocus amount when a person, for example, passes in front of the main object or when the main object momentarily goes out of the focus detecting frame. There may also be an overrun of the phototaking lens due to a sudden change in the lens driving direction in case of an object passing by the camera.

SUMMARY OF THE INVENTION

In consideration of the above-explained drawbacks of the prior technology an object of the present invention is to provide an automatic focusing device capable of focusing operation accurately tracking a moving object.

The above-mentioned object can be attained, according to the present invention, by an automatic focusing device provided with a phototaking lens for forming the image of an object on a predetermined plane equivalent to the photographic film plane; focus detecting means for detecting the amount of defocus of the image plane of said phototaking lens with respect to said equivalent plane; lens position detecting means for detecting the position of said phototaking lens; in-focus lens position determining means for determining an in-focus lens position for said phototaking lens based on the defocus amount and the lens position; lens movement pattern memory means for storing lens movement pattern information indicating the lens position as a function of time for focusing said phototaking lens to a particular moving object; and lens drive control means for controlling said phototaking lens based on said lens position, in-focus lens position and lens movement pattern information.

The lens drive control means is adapted to control the lens position in such a manner that the position of said phototaking lens coincides with said lens movement pattern information, and corrects the lens position at each generation of the in-focus lens position. More specifically, said control means controls the lens in such a manner that the actual lens position coincides with the lens movement pattern information (having the initially obtained in-focus lens position as the initial position) by reading said information with the lapse of time, and, when a new in-focus lens position is obtained in the course of said control, correcting the lens position to match the lens movement pattern information with said in-focus lens position, and re-starting the reading of the lens movement pattern information from thus corrected position.

Also the lens drive control means may be provided with start means for initiating control according to the lens movement pattern information, thereby enabling starting the lens drive according to the lens movement pattern information when predetermined photographing conditions are obtained.

The automatic focusing device of the present invention, constructed as explained above, stores in advance the lens movement pattern information representing the lens position as a function of time (corresponding for example to a particular moving object), and controls the phototaking lens according to said information, thereby achieving a lens focusing operation more accurately following the moving object.

Also the error between the lens position according to the lens movement pattern information and the in-focus lens position corresponding to the actual object movement can be minimized because it is corrected in succession by the intermittently generated in-focus lens position of the moving object.

Another object of the present invention is to provide an automatic focusing device capable of minimizing the error in focusing locus relative to the object movement, thereby enabling constant focusing on the film plane.

The object can be attained, according to the present invention, by an automatic focusing device provided with a phototaking lens for forming the image of an object on a predetermined plane; locus memory means for storing the relation between the lens position and time for focusing said phototaking lens to a particular moving object as the lens movement pattern information or locus information; focus detection means for detecting the defocus amount of the image plane of said phototaking lens with respect to said predetermined plane; lens position detecting means for detecting the position of said phototaking lens; in-focus position detecting means for intermittently detecting the in-focus lens position to which the phototaking lens is to be focused, based on said defocus amount and on the lens position; in-focus position memory means for the time-sequentially storing said intermittently detected plural in-focus lens positions; locus correction means for generating corrected locus information by correcting said locus information so as to reduce the error between the lens position information stored in said locus memory means and the in-focus lens position detected by said in-focus position detecting means; and lens drive control means for controlling said phototaking lens according to said corrected locus information.

Said locus correcting means is adapted to generate said corrected locus information, by correcting the locus information with proportional enlargement and parallel displacement of the lens position and the time.

Said locus correcting means may also be so constructed as to generate the corrected locus information by correcting the locus information so as to reduce the error with respect to the in-focus lens positions of a predetermined past time or of a predetermined number in the past.

The above-explained automatic focusing device of the present invention stores in advance the locus of in-focus lens positions for a particular moving object as locus information representing the lens position as a function of time, corrects said locus information so as to reduce the error relative to plural in-focus lens positions obtained by intermittently detecting the actual movement of the object, and controls the phototaking lens based on thus corrected locus information, whereby highly precise focusing control is possible.

The above-mentioned object can also be attained, according to another embodiment of the present invention, by an automatic focusing device provided with a phototaking lens for forming the image of an object on a predetermined plane; focus detecting means for detecting the defocus amount of the image plane of said phototaking lens with respect to said predetermined plane; lens position detecting means for detecting the lens position of said phototaking lens; in-focus position detecting means for detecting the in-focus lens position to which said lens is to be focused, based on said defocus amount and said lens position; in-focus detecting means for detecting plural in-focus lens positions generated time-sequentially; plural in-focus position memory means for storing plural in-focus lens positions generated time-sequentially and corresponding time; locus calculating means for determining locus information representing the relation of lens position and time for focusing said phototaking lens to a particular moving object, from the in-focus lens positions and times stored in said plural in-focus position memory means; locus memory means for storing said locus information; means for selectively erasing the locus information stored in said locus memory means; and lens drive control means for controlling said phototaking lens based on said locus information.

Said automatic focusing device may be provided with mode selection means for selecting either an operation mode for storing the plural in-focus lens positions and times generated time-sequentially by said in-focus position memory means, or an operation mode for controlling said phototaking lens by said lens drive control means according to the locus information.

Also there may be provided memory selection means for selecting one of said plural in-focus position memory means and causing display means to display the content thereof.

Such automatic focusing device of the present invention measures the in-focus position and time by direct focus detection of the actual object movement, and generates the locus information of the phototaking lens for the particular moving object by statistical processing of plural data obtained by executing the above-mentioned measurement plural times, whereby more exact locus information can be obtained.

Still another object of the present invention is to provide an automatic focusing device provided with a prediction drive capable of preventing erroneous lens drive such as overrun, even in case of detection of an erroneous defocus amount or of sudden change in the lens driving direction.

The above-mentioned object can be attained, according to another embodiment of the present invention, in an automatic focusing device provided with tracking means for generating a tracking signal indicating predicting object movement based on plural past focus detection signals of the focus detecting means, and lens driving means for driving a phototaking lens based on the tracking signal of said tracking means, the device further comprising:

locus determination means for determining a locus function indicating the movement locus of the object, based on information relating to the object movement and the focus detection signal of said focus detecting means;

prediction means for generating a signal representing predicted movement of the object based on the locus function determined by said locus determination means;

deviation discrimination means for discriminating whether the latest focus detection signal from said focus detection means is deviated from the movement represented by the predicted movement signal generated by said prediction means; and prediction control means for calculating a lens driving amount either based on the predicted movement signal of said prediction means in case a deviation is identified, or based on the tracking signal of said tracking means in case a deviation is not identified.

In the foregoing embodiment the tracking means generates the tracking signal representing the predicted movement based on the plural past focus detections, and the prediction means generates the predicted movement signal representing predicted object movement from the locus function representing the locus of object movement determined from the information on object movement and on the focus detection signal, and the lens is controlled either by said tracking signal or by said predicted movement signal, according to the output of the deviation discriminating means.

Thus said embodiment is capable of driving the phototaking lens based on a signal best tracking the movement of the principal object, and of preventing the lens overrun even if the driving direction of lens is inverted, as the future lens motion can be predicted from the locus function.

BRIEF DESCRIPTION OF THE DRAWINGS

FIG. 6 is a schematic view showing a format of storing a lens movement pattern.

FIGS. 19A and 19B are charts showing the process in the in-focus position memory means;

FIGS. 21, 22, 23A and 23B are charts showing the process in the locus memory means;

FIGS. 41 to 47 illustrate a ninth embodiment of the present invention, in which FIG. 41 is a block diagram of said embodiment;

FIG. 42 is a schematic view showing an example of a geometrical arrangement of an object and a camera;

FIG. 44 is a chart showing plats of an image equation for different locus parameter constants C;

FIG. 45 is a chart showing the relation between the converted time T of the stored image equation and the image plane moving speed;

FIG. 46 is a chart showing the movement locus in said embodiment;

FIG. 47 is a chart showing the compensation for lens drive amount when the object passes the shortest distance position;

FIGS. 49 and 50 show charts relating to an eleventh embodiment of the present invention, wherein FIG. 49 is a chart showing plural stored image equations;

FIG. 50 is a chart showing movement loci in said eleventh embodiment;

DESCRIPTION OF THE PREFERRED EMBODIMENTS

Figure 5:
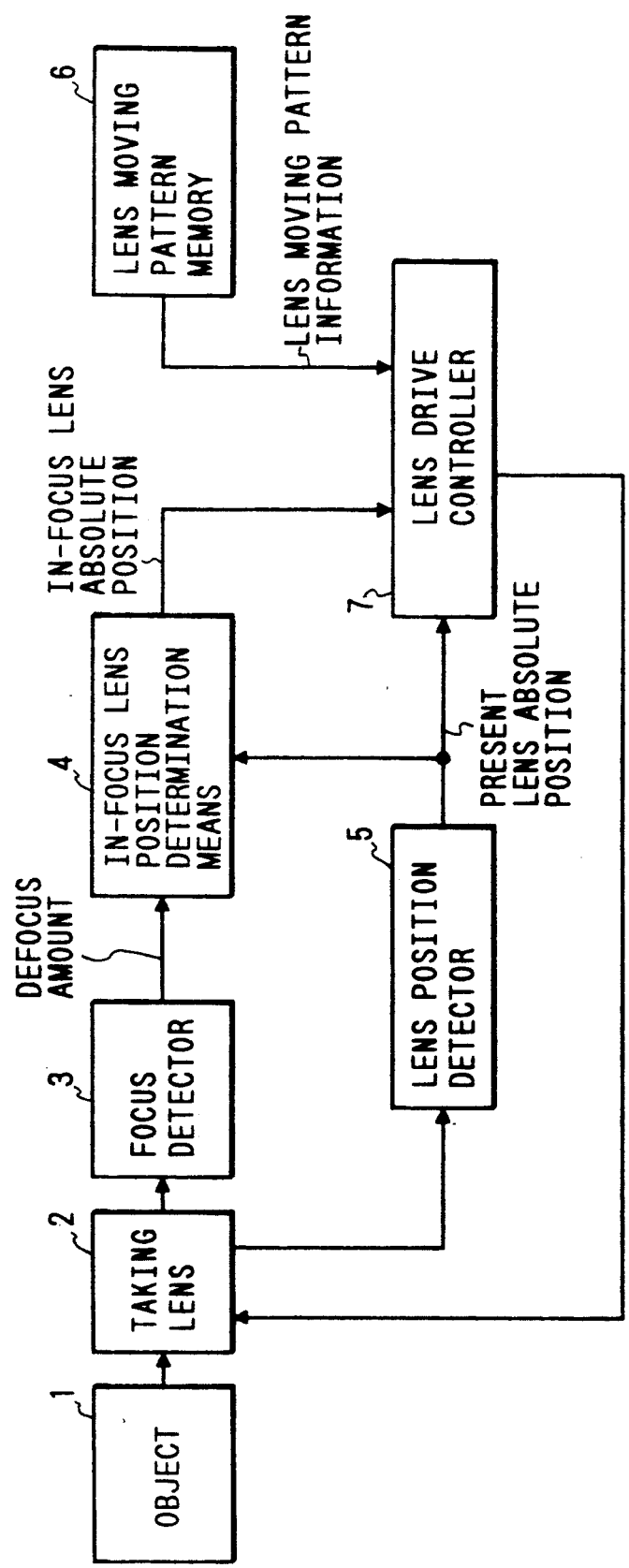
FIG. 5 is a block diagram of a first embodiment of the automatic focusing device of the present invention.

FIG. 5 is a block diagram of a first embodiment of the automatic focusing device of the present invention.

Referring to FIG. 5, the light beam from an object 1 is transmitted by the phototaking lens 2 and forms an image of the object on a film plane. The light beam is also split, by a known sub-mirror, from the photographing optical axis and is guided to focus detection means 3 positioned for example at the bottom of the camera. Said focus detector means 3 is composed of a known focus detecting optical system, an image sensor and a focus detecting calculation unit, and, upon receiving the light from the object 1, detects the direction and amount of deviation between the object image plane and the film plane (hereinafter collectively called defocus amount). Said defocus amount is given at intervals, because the focus detector means 3 requires a charge accumulating time for the image sensor and a calculating time for focus detection. Said interval becomes longer when a photographing operation is conducted, since the focus detection cannot be executed during said operation.

Lens position detector means 5, for detecting the absolute position of the phototaking lens 2 (for example, represented by the lens shifting distance from a reference position of the lens 2 focused at the infinite object distance) is composed of an encoder for generating a predetermined number of pulses corresponding to a predetermined amount of movement of the lens 2, a counter for adding or subtracting the output pulses of said encoder according to the lens moving direction, and reset means for initializing said counter. The content of said counter provides information corresponding to the absolute position of the phototaking lens, this being accomplished by resetting said counter after retracting the lens 2 to a position focused to the infinite distance at the start of power supply to the automatic focusing device, and thereafter counting the output pulses of said encoder.

In-focus lens position determining means 4 converts the defocus amount generated by the focus detector means 3 into a moving distance of the lens 2, and adds said moving distance corresponding to the defocus amount to the lens position at the generation of said defocus amount, thereby determining a lens position for focusing the phototaking lens 2 to the object at the current moment (hereinafter called in-focus lens position). If the phototaking lens is moving in the course of focus detecting operation (charge accumulating time of image sensor and calculating time) of the focus detector means 3, a compensation corresponding to such lens movement is added to the defocus amount or to the in-focus lens position.

Lens movement pattern memory means 6 stores in advance lens movement pattern information representing the lens position as a function of time for a particular moving object.

Figure 2:
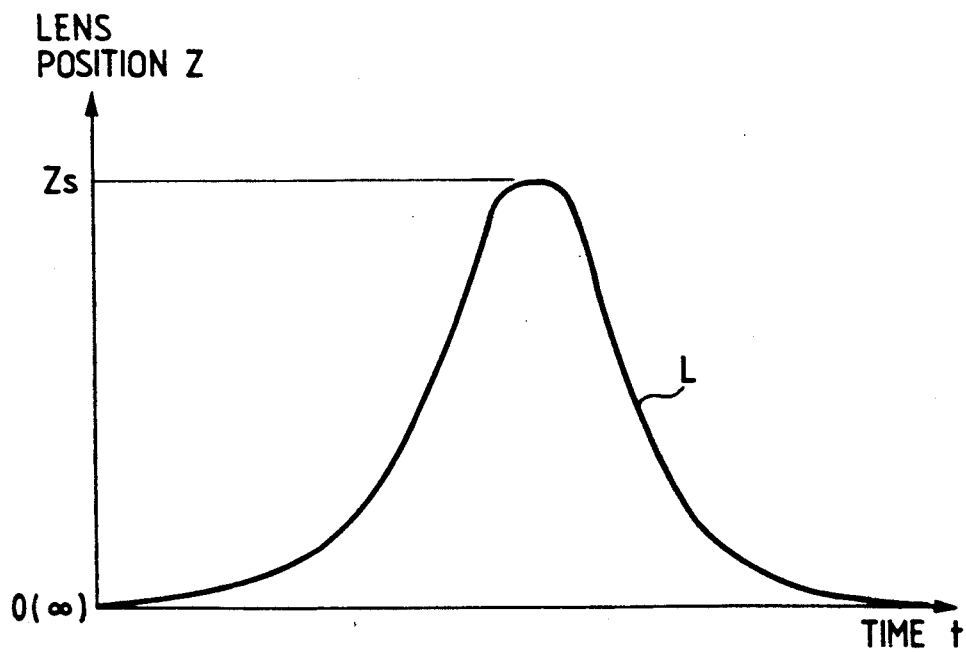
FIG. 2 is a chart showing lens movement pattern information.
Figure 3:
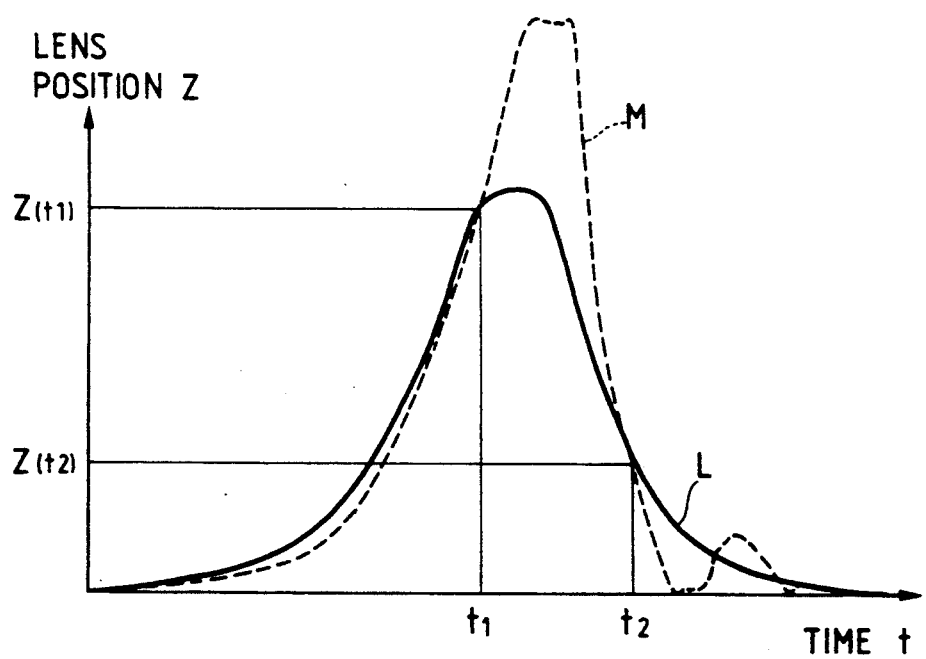
FIG. 3 is a chart showing a conventional tracing operation.

For example, if the lens movement pattern information corresponding to the photographing situation of the moving object is represented by the solid line L in FIG. 2, the relationship between the lens position Z(t) and time t is stored in a memory such as a ROM or a RAM, by addresses X, X+1, X+2, ... and data Z0, Z1, Z2, ... as shown in FIG. 6, wherein the addresses X, X+1, X+2, ... are defined by multiples of an interval $\Delta T$. In FIG. 6, X is a reference address, $\Delta T$ is the interval and Z is the lens position.

Again referring to FIG. 5, lens drive controller means 7 controls the drive of the phototaking lens 2 in position and time, in such a manner that said lens 2 is focused to the particular moving object, based on the lens movement pattern information, in-focus lens position information and lens position information.

Now reference is made to FIGS. 7 and 8 for explaining he control operation of the lens drive controller 7.

Figure 7A:
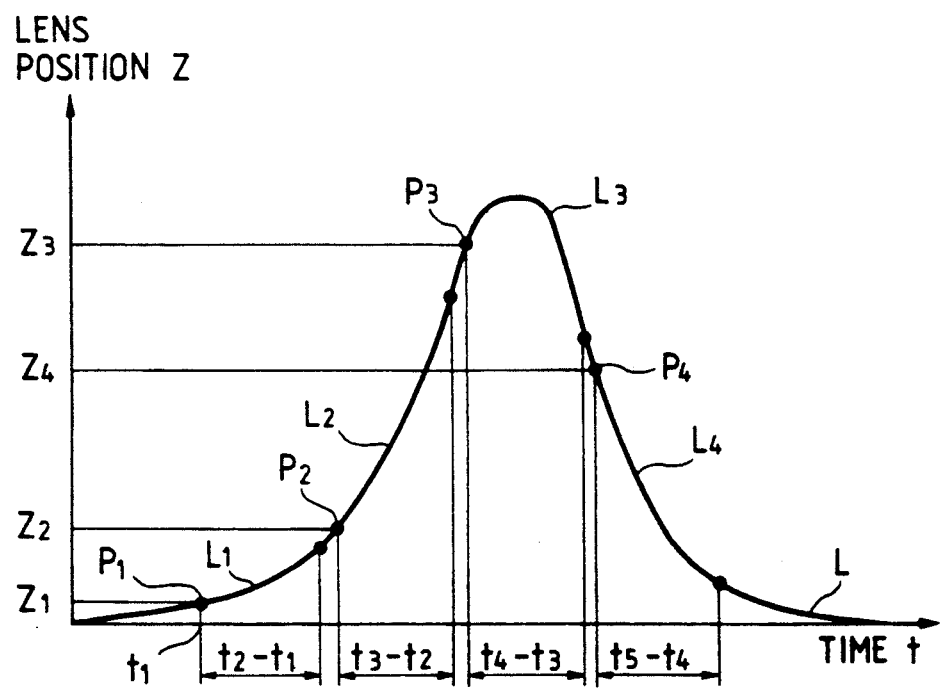
FIGS. 7A, 7B, 8A, 8B and 9 are charts showing the function of lens movement control means.

In FIG. 7A, a solid line L represents a lens movement pattern indicating the relation between the lens position and time, corresponding to a particular moving object. When in-focus lens position information Z1 (initial position) is generated at a time t1, there is looked for a point P1 where the lens movement pattern L assumes the value Z1. Though the lens movement pattern L has two values in time for a lens position Z, the point P1 can be determined by selecting a value with smaller time t.

When the first point P1 is determined, the lens drive controller 7 controls the lens 2, until the in-focus lens position information Z2 is generated at the next time t2, in such a manner that the position-time relationship of the lens 2 corresponds to a part L1 of the lens movement pattern L starting from the point P1.

Figure 7B:
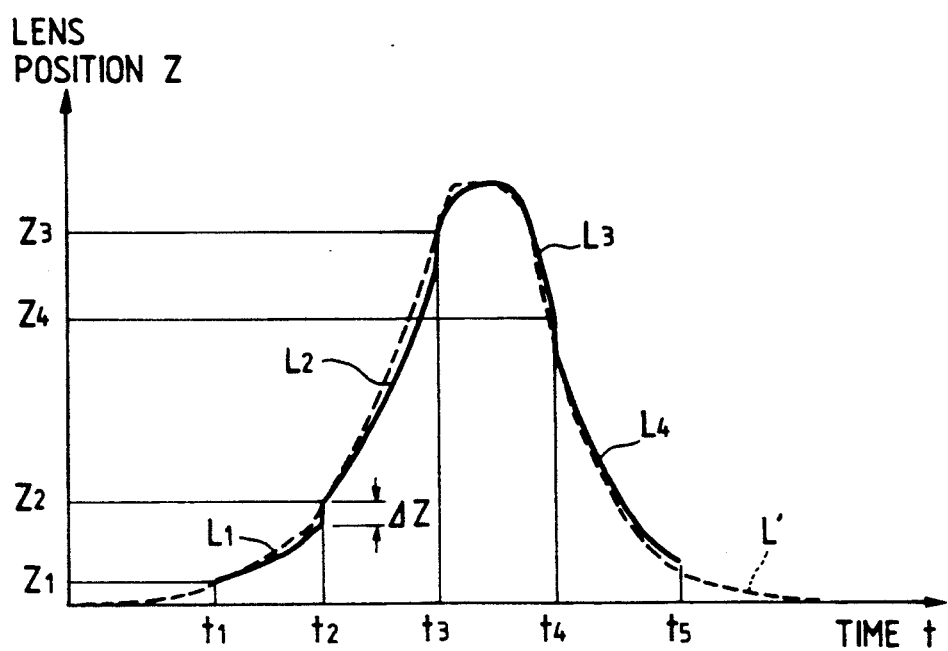

Consequently the lens position, which is the actual control target, follows a solid line L1 shown in FIG. 7B.

In FIG. 7B, a broken line L' indicates the lens position-time relationship strictly following the actual object movement. Said broken line L' differs for each moving object, and does not strictly match the lens movement pattern L in FIG. 7A, but is anticipated to show little error in comparison therewith. Consequently, unless the period from t1 to t2 is extremely long, the error at time t2 is little even if the lens is driven using the solid line L1 as the target.

When new in-focus lens position information Z2 is generated at time t2, there is looked for a point P2 where the lens movement pattern L assumes a value Z2, under a condition that said point P2 appears closest to P1 after said point P1. The phototaking lens 2 is controlled according to the lens position information in such a manner that the lens position-time relationship corresponds to a part L2 of the lens movement pattern starting from the point P2, until the in-focus lens position information Z3 is generated at a next time t3. Consequently, the error at the time t2 between the broken line L' (indicating the lens position corresponding to the actual object) and the control target L1 is compensated at that point.

Thereafter similar operations are repeated for the latest in-focus lens position information Z3, Z4, Z5, ... generated at times t3, t4, t5, ... to obtain control targets L3, L4, L5, ... shown in FIG. 7.

Since the control targets L1, L2, ... are not continuous at times t1, t2, ..., the actual movement of the phototaking lens 2 does not match said targets L1, L2, ... at such points. However the lens 2 can be so controlled as to match such targets L1, L2, ... at other periods, so that there is only little difference in the final result of actual lens position control from the lens position-time relationship in strict correspondence with the actual object movement.

Also the in-focus lens position information generated at intervals is not directly used for the drive control of the phototaking lens 2 but is merely used for the compensation of the lens movement pattern. Consequently the error in the lens drive control does not increase even when said interval becomes longer.

Furthermore, in order to reduce the error at the times t1, t2, ..., it is also possible to expand or reduce the time axis to the next target control according to the difference ΔZ between the in-focus lens position and the actual lens position and according to the lens moving direction, at the generation of new in-focus lens position information. For example, at the time t2 in FIG. 7B, the difference ΔZ between the generated in-focus lens position Z2 and the control target L1 is positive, and the lens moving direction is also positive, indicating that the actual moving speed of object is faster than predicted, or that the actual lens movement pattern L' is compressed on the time axis in comparison with the stored lens movement pattern L. It is therefore possible to compress the control target L2 starting from the time t2, (to increase the rate of change in time) according to the difference ΔZ, thereby decreasing the error at t3.

Figure 8A:
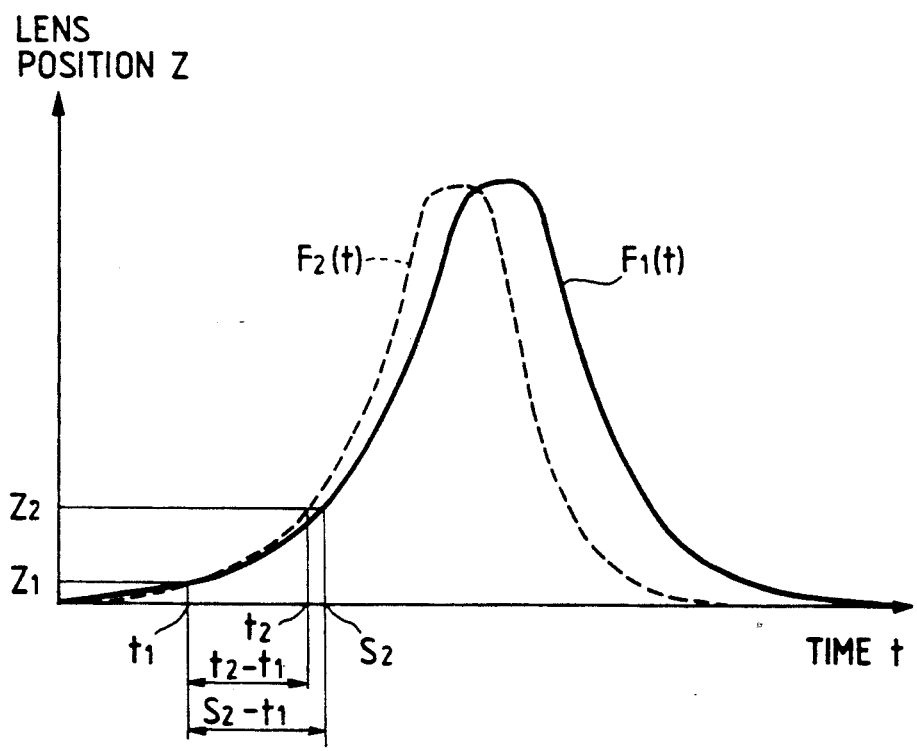
Figure 8B:
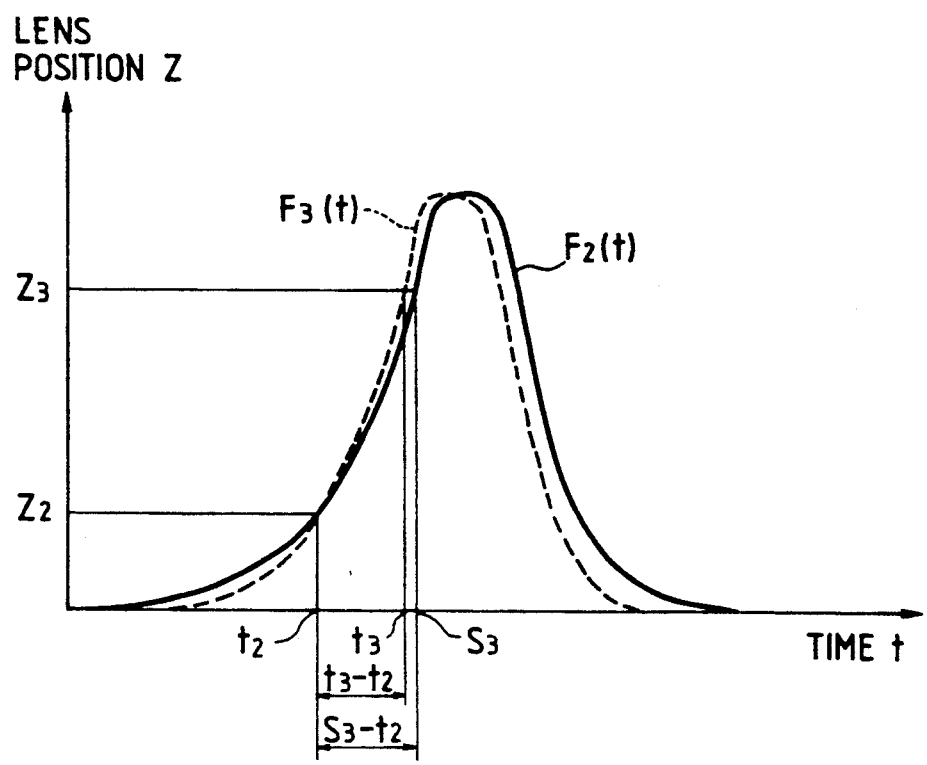

Now reference is made to FIGS. 8A and 8B for explaining an embodiment in which the drive control for the phototaking lens 2 is executed according to the above-explained method. Referring to FIG. 8A, the lens drive control is started from the lens position Z1 at t1, according to the stored lens movement pattern Z=F1(t). When the in-focus lens position information Z2 is obtained at t2, there can be determined a time S2 for reaching the lens position Z2 if the lens movement is continued along the function Z=F1(t). The error in lens position Z at time t2 can be considered to have resulted from a fact that the actual object movement corresponds to a lens movement pattern Z=F2(t) different from the pattern Z=F1(t) stored in advance. The pattern Z=F2(t) can be expressed as follows, on the assumption that it is obtained by a compression or expansion in time axis and a parallel displacement of the pattern Z=F1(t):

$$F2(t) = F1(a2^*t + b2) \quad (A)$$

Also there stand following conditions at times t1, t2, S2 and lens positions Z1, Z2:

$$F2(t1) = F1(t1) = Z1$$

$$F2(t2) = F1(s2) = Z2 \quad (B)$$

The coefficients a2, b2 in the equation (A) can be determined from the equations (B) as follows:

$$a2 = (t2 - t1)/s2 - t1)$$

$$b2 = \{(S2 - t2)/(S2 - t1)\}^*t1 \quad (C)$$

Consequently the drive control of the phototaking lens from the time t2 can be conducted according to the lens movement pattern Z=F2(t) determined by the conditions (A) and (C).

Then, when the lens drive control is started, as shown in FIG. 8B, from the lens position Z2 at t2 according to the lens movement pattern Z=F2(t) and the in-focus lens position information Z3 is obtained at t3, there can be determined a time S3 for reaching the lens position Z3 if the lens movement is continued according to the function Z=F2(t). In a similar manner as the foregoing, there can be considered, in a period from t2 to t3, a lens movement pattern Z=F3(t) which is obtained by a compression or expansion and a parallel displacement of the lens movement pattern Z=F2(t) on the time axis, as follows:

$$\begin{aligned} F3(t) &= F2(a3^*t + b3) \\ &= F1(a2^*a3^*t + b2 + a2^*b3) \\ &= F1(A3^*t + B3) \end{aligned} \quad (D)$$

Also there stand conditions at times t2, t3, S3 and lens positions Z2, Z3:

$$F3(t2) = F2(t2) = Z2$$

$$F3(t3) = F2(t3) = Z3 \quad (E)$$

The coefficients a3, b3, A3, B3 in the equation (D) can be determined from the relations (E) as follows:

$$a3 = (t3 - t2)/(S3 - t2)$$

$$b3 = \{(S3 - t3)/(S3 - t2)\}^*t2 \quad (F)$$

$$A3 = a2^*a3$$

$$B3 = a2^*b3 + b2$$

Consequently the lens drive control from time t3 can be executed according to the lens movement pattern Z=F3(t) determined from the equations (D) and (F).

In general, when the in-focus lens position information Zn is obtained at a time tn, a time Sn for reaching the lens position Zn according to the lens movement pattern Z=Fn-1(t) immediately before tn is determined, and the lens drive control can be executed from the time tn according to a lens movement pattern Z=Fn(t) represented as follows:

$$\begin{aligned} Fn(t) &= Fn - 1(an^*t + bn) \\ &= F1(An^*t + Bn) \end{aligned}$$

wherein:

$$a_n = (t_n - t_{n-1})/(S_n - t_{n-1})$$

$$b_n = \{(S_n - t_n)/(S_n - t_{n-1})\}^* t_{n-1} \quad (G)$$

$$A_n = a_n \times A_{n-1} = a_1 \times a_2 \ldots \times a_n$$

$$B_n = B_{n-1} + A_{n-1} \times b_n \ldots$$

and $A_1 = 1$, $B_1 = 0$, $a_1 = 1$, and $b_1 = 0$.

It is furthermore possible to fix the time axis without compression or expansion, and to determine the rate K of variation of error in time as:

$$K = \Delta Z/(t2 - t1)$$

from the error $\Delta Z$ at time t2 in FIG. 7B and to compensate the control target L2 in the next period from t2 to t3 by $L2 + K(t - t2)$.

Figure 9:
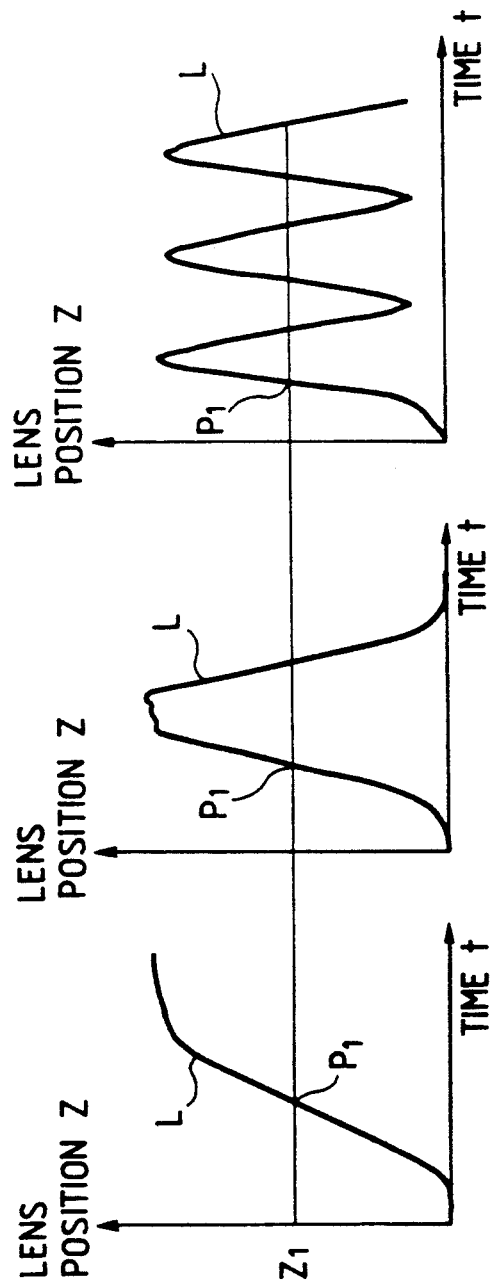

In general the lens movement pattern L has plural values for a lens position Z as shown in FIG. 9, but the search for a point corresponding to the in-focus lens position can be conducted in the direction of time axis and there is selected a point appearing after the preceding point and having the same moving direction as that of said preceding point.

In case a point corresponding to the generated in-focus lens position Z does not exist on the lens movement pattern L due to the deviation from the predicted distance, there is selected a point, on the lens movement pattern L, closest to the in-focus lens position Z, in the vicinity of the elapsed time from the preceding point on the time axis.

Also in case the focus detection becomes impossible at a certain time, or in case the difference between the generated in-focus lens position Z and the present lens position is larger than a predetermined value, the lens drive control may be continued with the preceding control target. Such continued control prevents the phototaking lens from being focused to the background even when the object temporarily runs out of the focus detecting area and the focus detection is conducted on the background.

Figure 10:
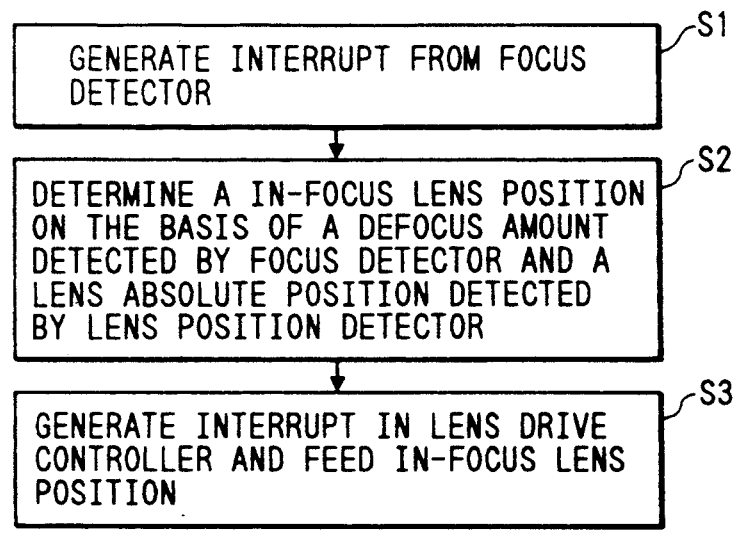
FIG. 10 is a flow chart showing the operation sequence of in-focus lens position determining means.
Figure 11:
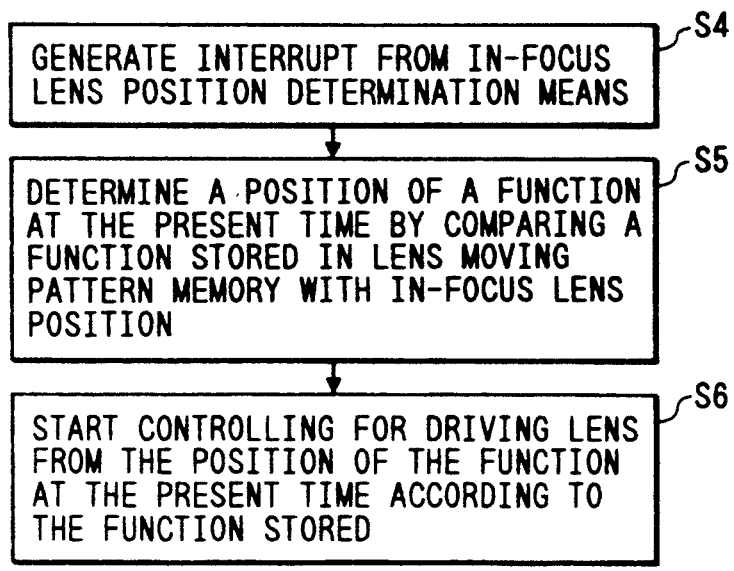
FIG. 11 is a flow chart showing the operation sequence of lens drive control means.

FIGS. 10 and 11 are flow chart of the operation sequence when the first in-focus lens position determining means 4 and the lens drive controller 7 are constituted by a microcomputer.

At first referring to FIG. 10, when the defocus amount is determined by the focus detector 3, a step S1 initiates an interruption procedure. A step S2 determines the in-focus lens position from the defocus amount and the lens position, and a step S3 initiates an interruption procedure. These steps correspond to the function of the in-focus lens position determining means 4.

Then, referring to FIG. 11, when the in-focus lens position determining means 4 initiates the interruption procedure in a step S4, a step S5 determines a corresponding point by a method shown in FIG. 8 based on the in-focus lens position and the lens movement pattern information, and a step S6 starts the drive control for the phototaking lens 2 according to the lens movement pattern L starting from said point. These steps correspond to the function of the lens drive controller 7.

Figure 12:
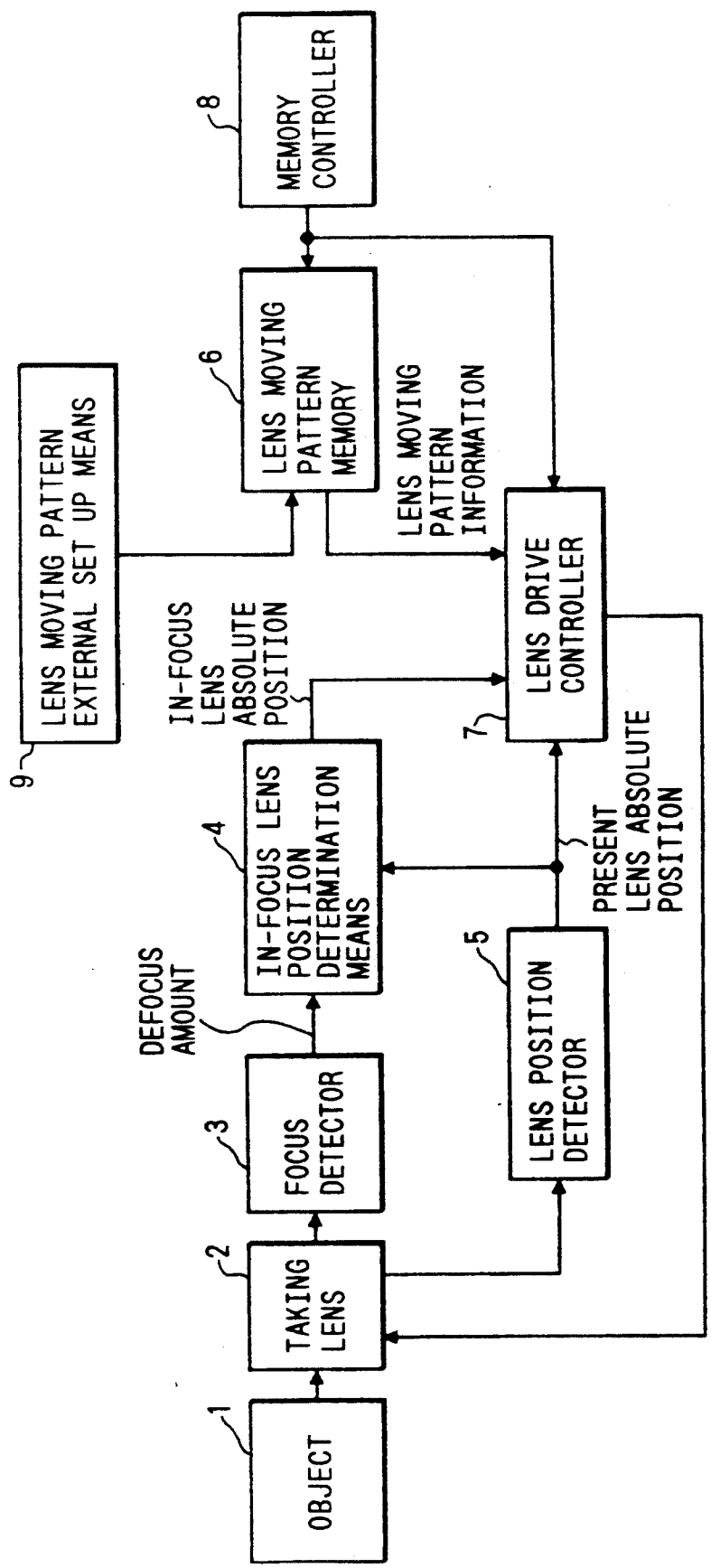
FIG. 12 is a block diagram of a second embodiment of the automatic focusing device of the present invention.

FIG. 12 shows a second embodiment of the present invention, in which the content of the lens movement pattern memory means 6 is externally settable, and which is formed by attaching external setting means 9 for the lens movement pattern and memory controller means 8 to the embodiment shown in FIG. 5.

The memory controller 8 is provided for resetting and renewing the content of the lens movement pattern memory means 6, and, in case of said pattern renewal, enables the memory writing into the lens movement pattern memory means 6 and disables the function of the lens drive controller 7. The lens movement pattern external-setting means 9 writes a new lens movement pattern into the memory of the lens movement pattern memory means 6 when the memory writing is enabled. Upon completion of writing, the memory controller 8 again disables the memory writing of the lens movement pattern memory means 6 and enables the function of the lens drive controller 7.

Figure 1:
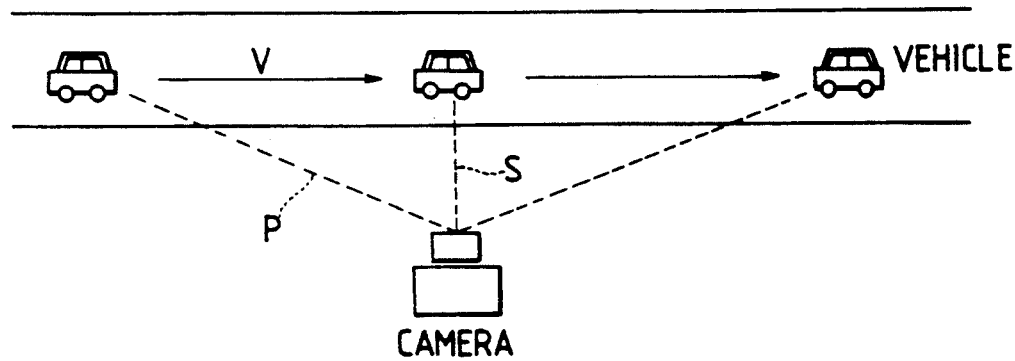
FIG. 1 is a schematic view of photographing a moving object.

The user may directly provide the external setting means 9 with a desired lens movement pattern, or select one of plural patterns provided in advance in the external setting means 9. Also the lens movement pattern may be calculated in the setting means 9 based on the photographing conditions (distance, speed etc.) provided by the user. For example; in a photographing situation shown in FIG. 1, the lens movement pattern can be calculated by the entry of the shortest distance S, initial distance P and speed V of automobile.

At first, the movement pattern d(t) of the object distance can be represented as follows:

$$d(t) = \sqrt{(V \cdot t - Z_0)^2 + S^2} \quad (2)$$

wherein:

$$Z_0 = \sqrt{P^2 - S^2}$$

Then the lens movement pattern Z(t) can be represented as:

$$Z(t) = (d(t)/2 - f) - \sqrt{(d(t)/2 - f)^2 - f^2} \quad (3)$$

wherein f is the focal length of the phototaking lens, and d(t) is the distance from the film plane to the object shown in (2).

This equation (3) can be approximated as:

$$Z(t) = f^2/(d(t) - 2f) \quad (4)$$

Figure 13:
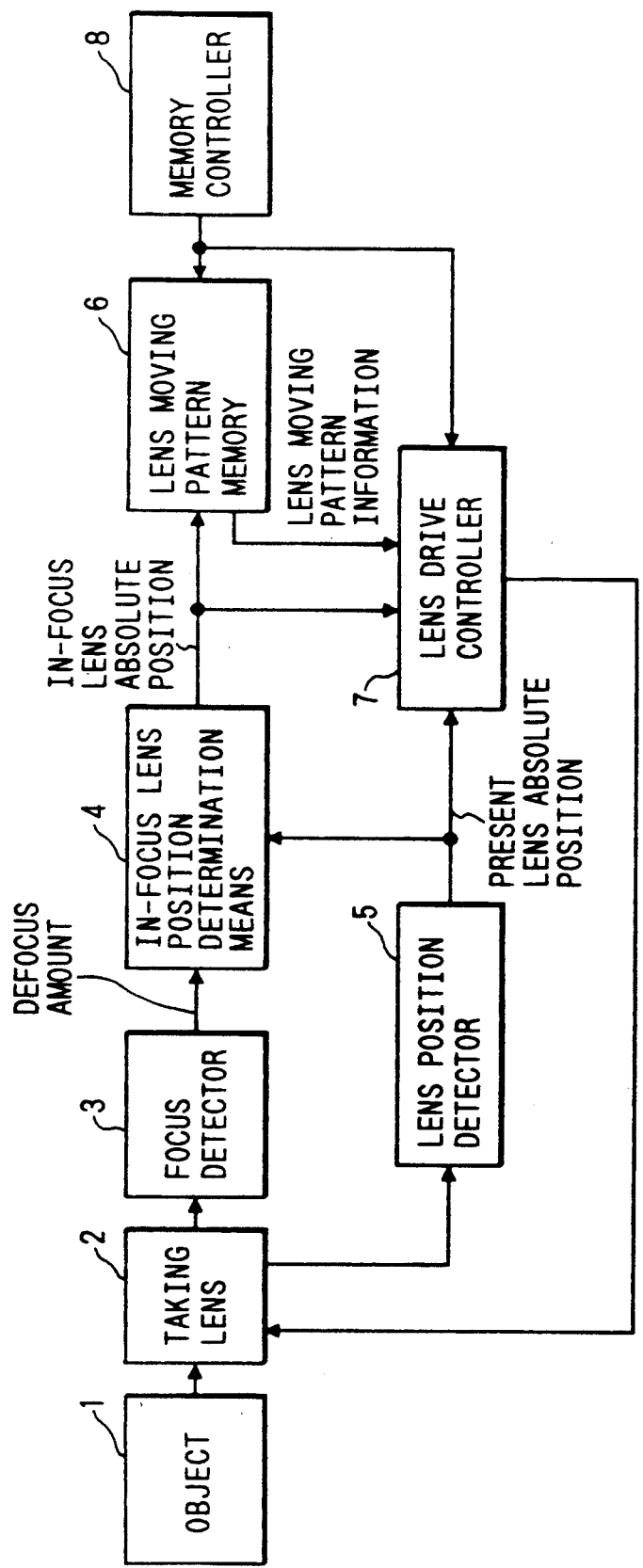
FIG. 13 is a block diagram of a third embodiment of the automatic focusing device of the present invention.

FIG. 13 shows a third embodiment of the present invention, which is featured by a fact that the content of the lens movement pattern memory means 6 can be set by the output of the in-focus lens position determining means 4, and which is formed by adding memory controller means 8 to the embodiment shown in FIG. 5.

The memory controller 8 is provided for resetting and renewing the content of the lens movement pattern memory means 6, and, for such renewing, enables the memory writing of the lens movement pattern memory means 6 and disables the function of the lens drive controller 7. When said memory writing is enabled, the in-focus lens position determining means 4 writes the in-focus lens position information, as the new lens movement pattern information, into the lens movement pattern memory means 6. Upon completion of said writing, the memory controller 8 disables the memory writing of the lens movement pattern memory means 6 and enables the function of the lens drive controller 7.

Figure 14:
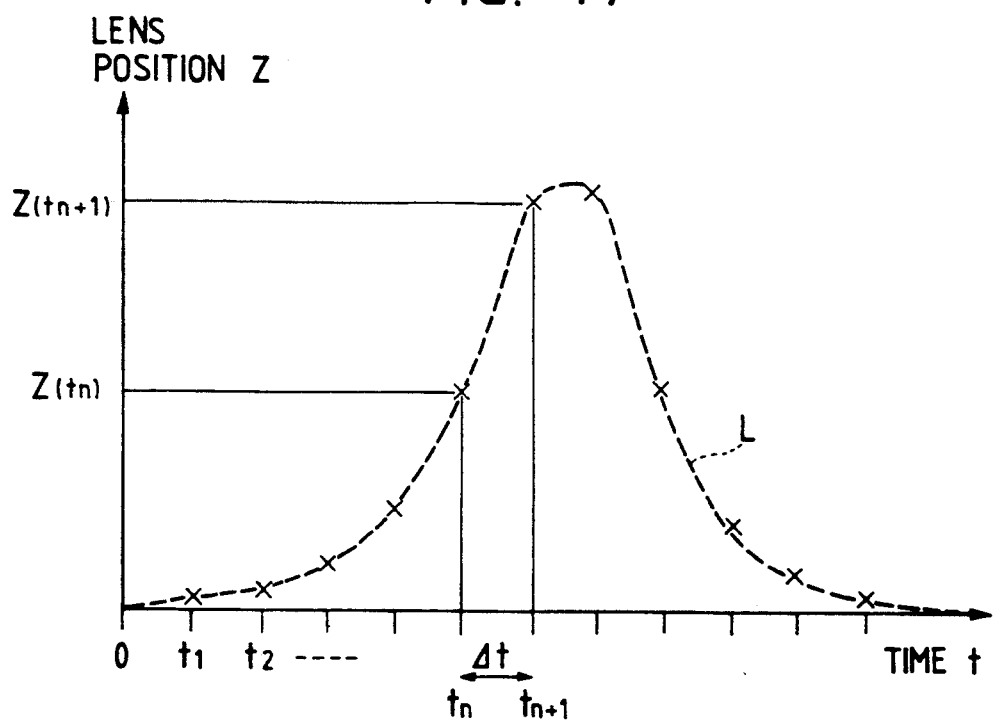
FIG. 14 is a chart of lens movement pattern information.

FIG. 14 shows the mode of writing of the lens movement pattern information into the lens movement pattern memory means 6 by the in-focus lens position determining means 4. Taking the enabling time of writing as a reference time, the in-focus lens position information Z(t) (indicated by marks "X") generated at t1, t2, . . . , tn, tn+1, . . . after said enabling, are written respectively in pair with time into the lens movement pattern memory means 6. If the interval Δt is large, there may be written intermediate lens position information.

In case of FIG. 14, the collection and writing of the lens movement pattern information are conducted while the phototaking lens 2 is stopped in order to shorten the interval Δt, but these operations may be conducted while the lens 2 is driven if the lens drive can be overlapped with the function of the focus detector 3. It is also possible to determine the lens movement pattern information by the average of plural detections instead of a single detection, or to record the lens movement pattern information and to feed the in-focus lens position information, obtained in the course of the function of the lens drive controller 7 based on said lens movement pattern information, back to said information.

In the case of a lens of long focal length the lens movement pattern information may be difficult to collect, because it is generally difficult to follow a moving object with such lens, and such lens also requires a large shifting amount. It is possible, however, to collect the lens movement pattern information with a lens of shorter focal length, to convert the lens position information into the object distance information by the equation (3), and to convert it again into the lens position information utilizing the focal length f of the lens to be used.

Figure 15:
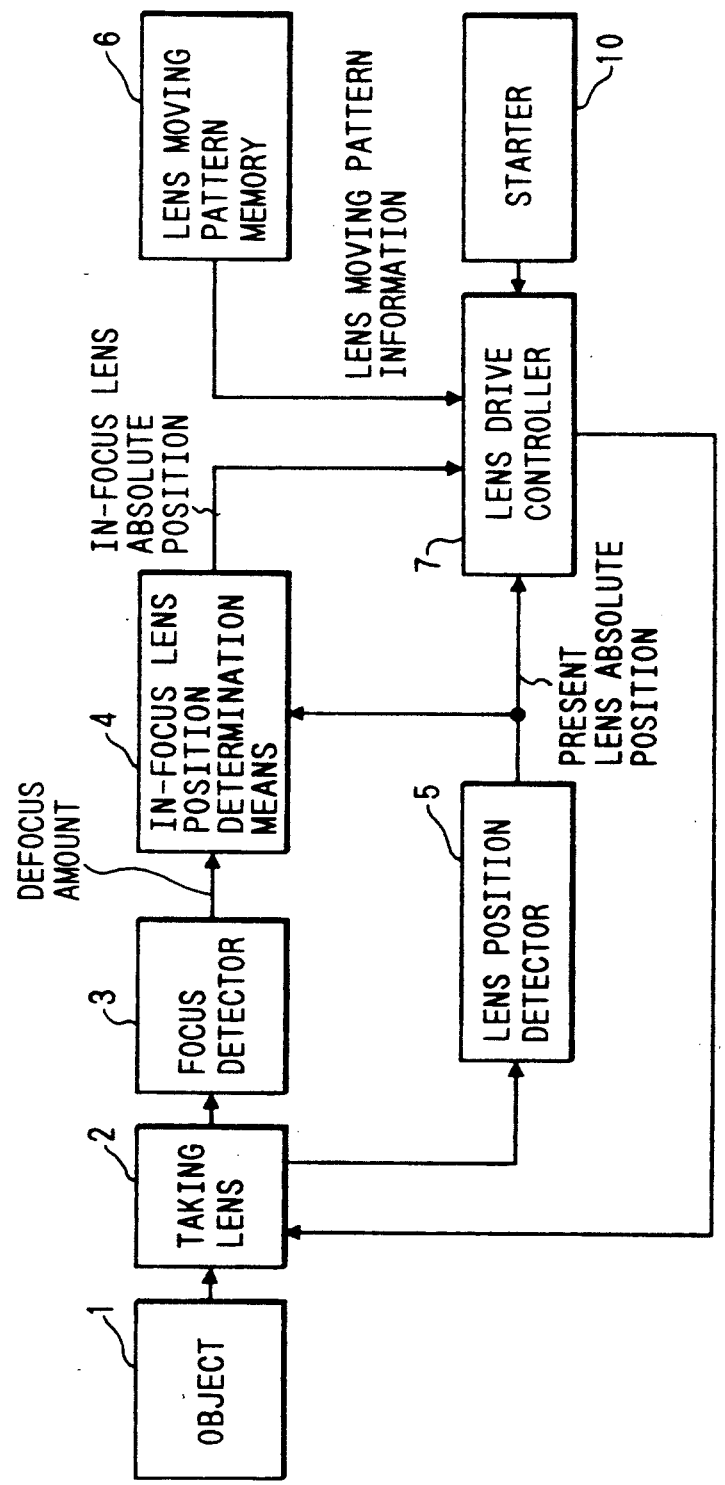
FIG. 15 is a block diagram of a fourth embodiment of the automatic focusing device of the present invention.

FIG. 15 shows a fourth embodiment of the present invention, which is featured by a fact that the activation of the lens drive controller 7 is controlled by starter means 10, and which is formed by adding said starter means 10 the embodiment shown in FIG. 5.

Said starter means 10 allows the user to activate the lens drive controller 7 from a desired time or a desired object distance.

For example, if the lens drive controller 7 is to be activated for a desired period, the starter means 10 can be a simple switch, which enables or disables the function of the lens drive controller 7.

Figure 16:
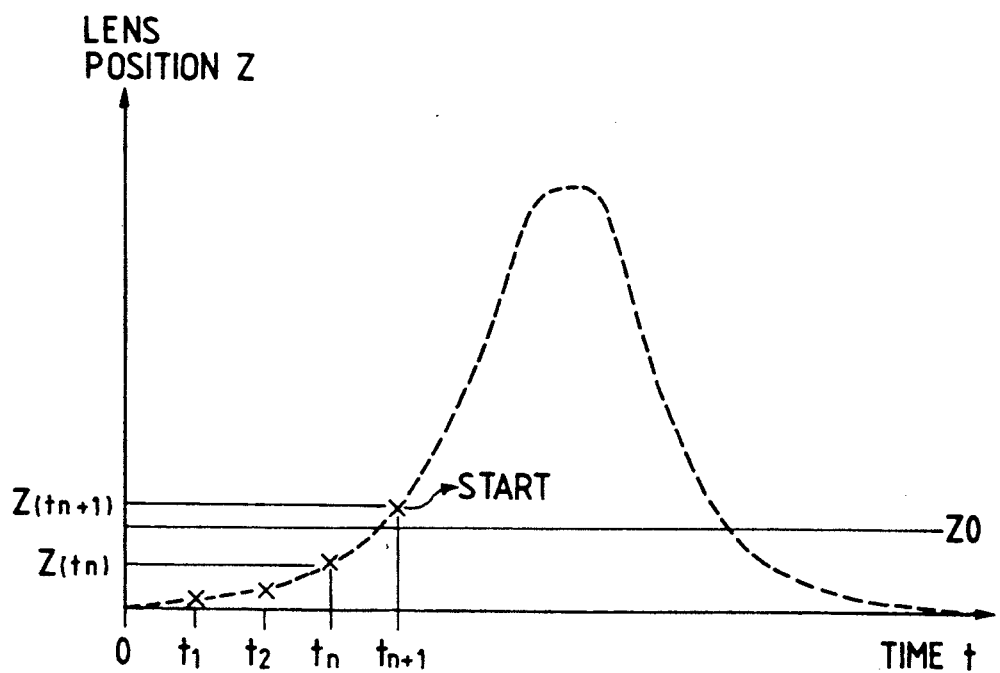
FIG. 16 is a chart showing the function of starting means.

Also in case of activation from a desired distance, the user sets a distance in the starter means 10. For example, if the user wishes to activate the lens drive controller 7, in a situation shown in FIG. 1, when the object distance P becomes equal to or less than a distance P, the user sets the information that the distance is equal to or less than P in the starter means 10. Said starter means 10 converts the distance P into the lens position Z0 by the equation (3), and monitors the in-focus lens position information generated at intervals. Referring to FIG. 16, when the object is farther than the distance P, the starter means 10 does not activate the lens drive controller since the in-focus lens position does not exceed Z0. As the object approaches, if the in-focus lens position information Z(tn+1) generated at a time $t_{n+1}$ exceeds Z0, the starter means 10 activates the lens drive controller 7. Said distance P may be set manually on the phototaking lens 2. In such case the set lens position can be supplied into the starter means 10 through the lens position detector means 5.

Prior to the activation of the lens driver controller 7 by the starter means 10, the phototaking lens 2 may be either stopped or driven according to the defocus amount, as in the conventional lens drive control.

In the foregoing embodiments, the lens movement pattern information is stored in the memory means 6 in the form of time t and lens position Z(t), but said information may also be stored in the form of time t and object distance d(t) according to the equation (3). Even for a lens with variable focal length, such as a zoom lens, such form of storage allows conversion to the lens position at any focal length, according to the equation (3).

In the foregoing embodiments, the drive control of the phototaking lens 2 is principally executed with the lens movement pattern information while the in-focus lens position information or the defocus amount is used for correction or compensation. It is also possible to normally effect the lens drive control such as prediction drive based on the defocus amount, and to switch to the lens drive control of the present invention when the focus detection becomes impossible or the conventional prediction drive becomes difficult to execute because of the short object distance.

Also in the foregoing embodiments shown in FIGS. 5, 12, 13 and 15, the defocus amount of the phototaking lens 2 is detected by the TTL method utilizing the focus detector means 3, but it is also possible to directly measure the object distance as, for example, by a trigonometric method.

The foregoing 1st to 4th embodiments enable exact tracking of the moving object even when the movement thereof is complex and rapid, since the lens drive is controlled according to the lens movement pattern information stored in advance, and said drive control is corrected by the intermittently generated in-focus lens position information. Also the photographing operation can be smoothly inserted between the focus detecting operations, since the interval between the generations of in-focus lens position information can be selected sufficiently long.

Figure 17:
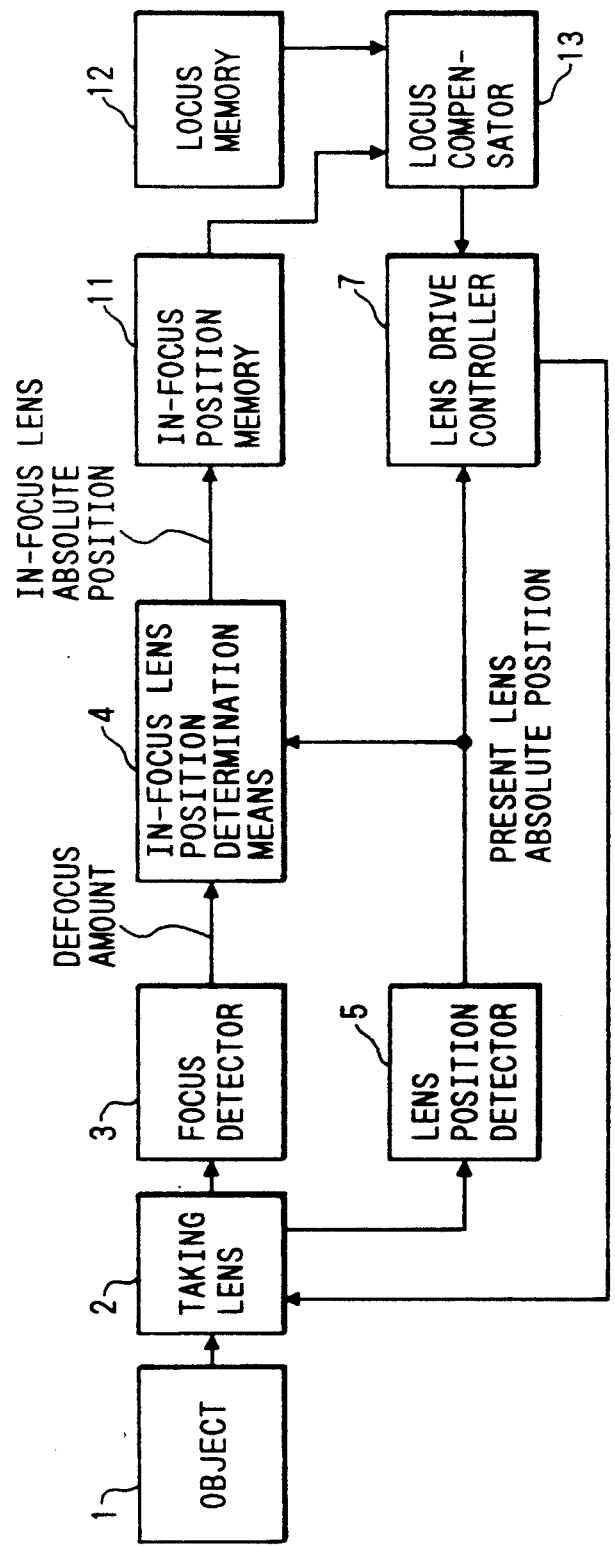
FIG. 17 is a block diagram of a fifth embodiment of the automatic focusing device of the present invention.

FIG. 17 is a block diagram of a fifth embodiment of the automatic focusing device of the present invention, applied to a camera.

Referring to FIG. 17, the light beam from an object 1 is transmitted by a phototaking lens 2 and forms an image of the object on a film plane. The light beam is also split, by a known sub-mirror, from the photographing optical axis and is guided to focus detector means 3 positioned for example at the bottom of the camera. Said focus detector means 3 is composed of a known focus detecting optical system, an image sensor and a focus detecting calculation unit, and, upon receiving the light from the object 1, detects the deviation between the object image plane and the film plane (said deviation including direction and amount; hereinafter collectively called defocus amount). Said defocus amount is given at intervals, because the focus detector means 3 requires a charge accumulating time for the image sensor and a calculating time for focus detection. Said interval becomes longer when a photographing operation is conducted, since the focus detection cannot be executed during said operation.

Lens position detector means 5, for detecting the absolute position of the phototaking lens 2 (for example, represented by the lens shifting distance from a reference position of the lens 2 focused at the infinite object distance) is composed of an encoder for generating a predetermined number of pulses corresponding to a predetermined amount of movement of the lens 2, a counter for adding or subtracting the output pulses of said encoder according to the lens moving direction, and reset means for initializing said counter. The content of said counter provides information corresponding to the absolute position of the phototaking lens 2. The counter is reset after retracting the lens 2 to a position focused to the infinite distance at the start of power supply to the automatic focusing device.

In-focus lens position determining means 4 converts the defocus amount generated by the focus detector means 3 into a moving distance of the lens 2, and adds said moving distance corresponding to the defocus amount to the lens position at the generation of said defocus amount, thereby determining a lens position for focusing the phototaking lens 2 to the object at the current moment (hereinafter called in-focus lens position). If the phototaking lens is moving in the course of focus detecting operation (charge accumulating time of image sensor and calculating time) of the focus detector means 3, a compensation corresponding to such lens movement is added to the defocus amount or to the in-focus lens position.

Figure 18:
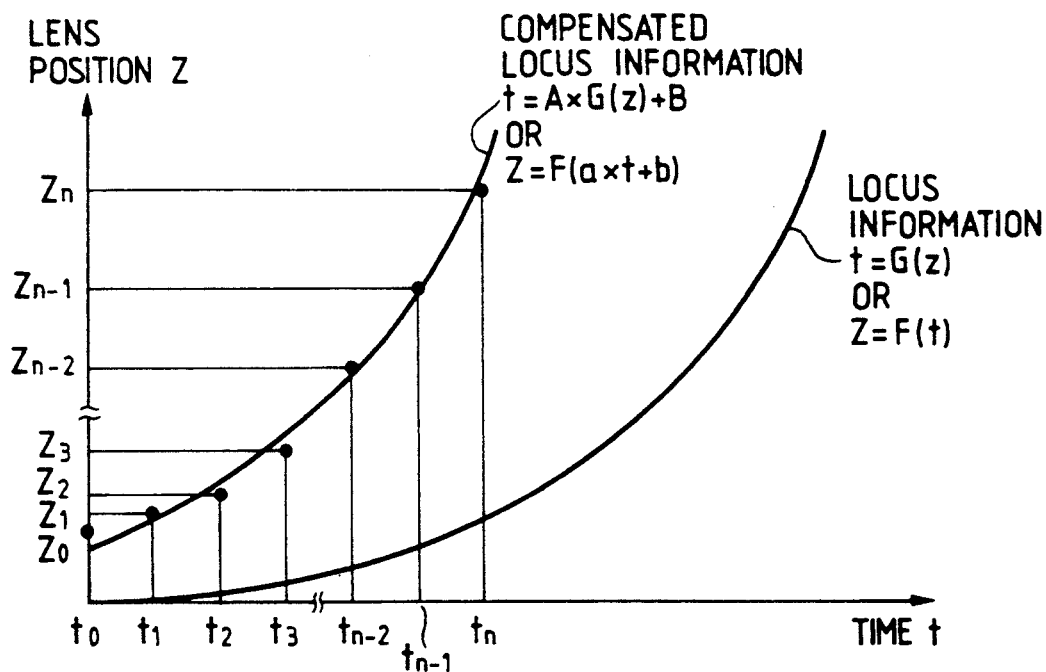
FIG. 18 is a chart showing locus information and compensated locus information representing lens position as a function of time.

In-focus position memory means 11 memorizes plural in-focus position data, intermittently generated by the in-focus lens position determining means 4, in respective pairs with the time of generation. For example, if the in-focus position data $Z0, Z1, Z2, \ldots, Zn-1, Zn$ are generated at times $t0, t1, t2, \ldots, tn-1, tn$ as shown in FIG. 18, the time t and the in-focus position Z are stored in a rewritable memory such as a RAM with respective addresses (reference addresses being Y, W) as shown in FIGS. 19A and 19B.

Locus memory means 12 stores in advance locus information or lens movement pattern information $Z=F(t)$ or $t=G(Z)$, indicating the in-focus lens position for a particular moving object, by the relationship between the lens position Z and time t.

Figure 4:
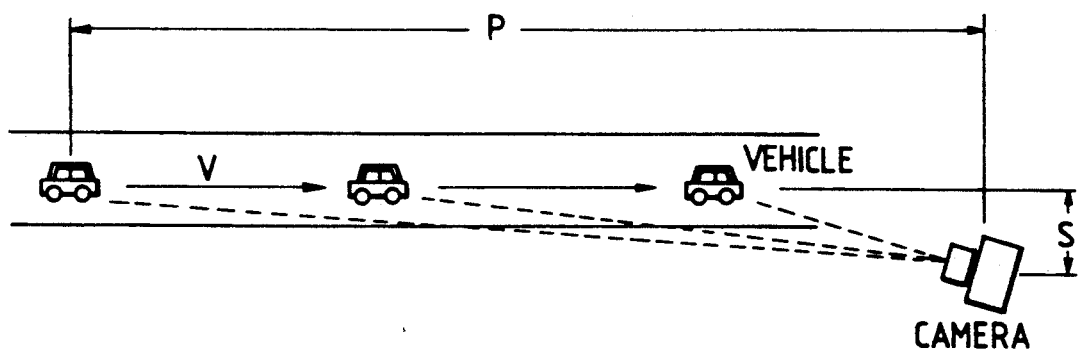
FIG. 4 is a schematic view showing an example of a photographing situation.
Figure 20:
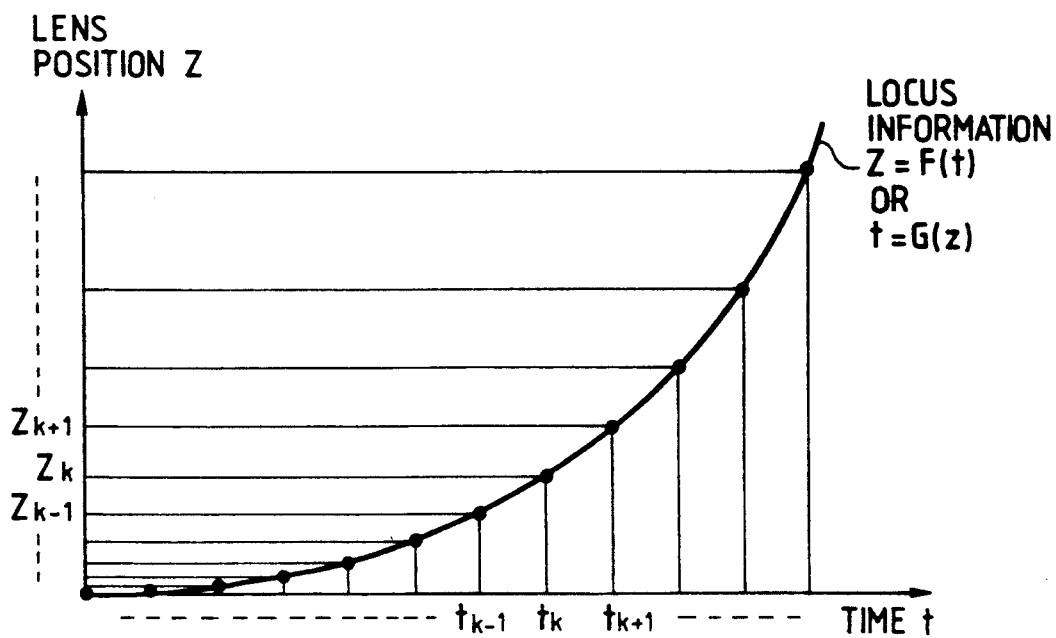
FIG. 20 is a chart showing the information stored in the locus memory means.
Figure 24:
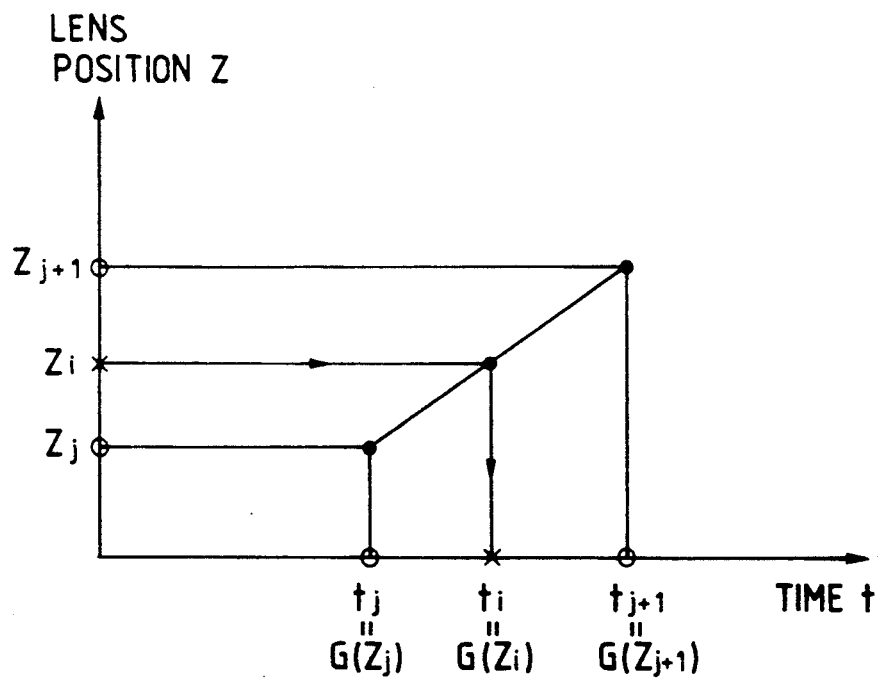
FIG. 24 is a chart showing the process in the locus compensating means.
Figure 26:
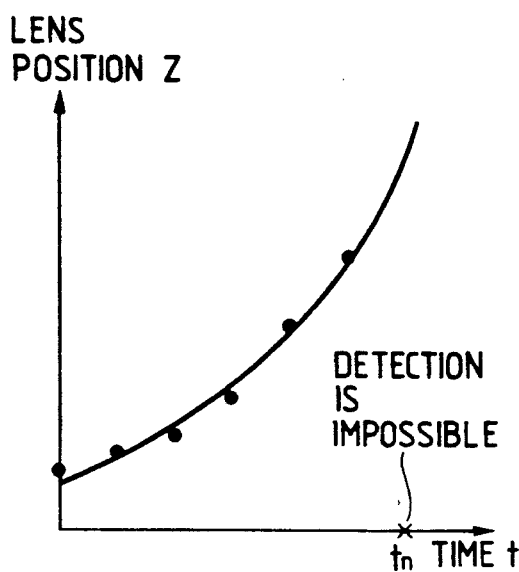
FIGS. 26 and 27 are charts showing the process in drive prohibition means.

For example, if a photographing situation of a moving object as shown in FIG. 4 is represented by locus information shown by a solid line in FIG. 20, the lens position Zk and time tk are stored in a memory, such as a ROM or a RAM, as coordinate values indicating the functional positions shown by each black point in FIG. 26, and intermediate values between the scattered points are filled in by a suitable interpolation equation. The storage of said locus information is conducted, for example, as shown in FIG. 21, by the time t and the lens position Z as a memory address and the memory content corresponding thereto. In FIG. 21, X indicates the reference address, ΔT is a constant time interval, and Z is the lens position. The lens position Z for a non-memorized time can be obtained from the lens position corresponding to the memorized time, according to a known interpolation equation.

In FIG. 21, the storage is conducted in the form of a function:

$$Z=F(t)$$

by taking the time t and the lens position Z respectively as a memory address and a memory content, but the storage may also be made in the form of a function:

$$t=G(Z)$$

as shown in FIG. 22, by taking the lens position Z and the time t respectively as a memory address and a memory content. In this case the data storage is made in the form of time of passing through lens positions Z predetermined at a constant interval.

In case the time t and the lens position Z are stored at irregular intervals, these values are stored separately, utilizing a factor k as an address offset value with respect to reference addresses V, U, as shown in FIGS. 23A and 23B. In this case the relationship between tk and Zk indicates the locus information $Z=F(t)$ and $t=G(Z)$ at the same time. The locus information function $F(t)$ or $G(Z)$ may be the original data of the time t and the in-focus position Z measured once or plural times with the in-focus lens position determining means 4 on the actual moving object, or may be obtained by a suitable procedure such as statistical processing or interpolation. Furthermore said function may be the data of time t and in-focus position Z calculated on an imaginary moving object. The locus information may also be a mathematical function itself, if the function $F(t)$ or $G(Z)$ can be represented by a mathematical equation. As an example, if said function is an n-th order equation, the values Z or t may be directly calculated from the coefficients, stored in advance, of said equation.

Locus compensator means 13 corrects the locus information stored by the locus memory means 13 in such a manner the errors with respect to the in-focus position data $(t0, Z0), (t1, Z1), \ldots, (tn, Zn)$ stored in the in-focus position memory means 11 become minimum. This operation will be explained in the following, with reference to FIG. 18, in a case where n sets of in-focus position data $(t0, Z0), (t1, Z1), \ldots, (tn, Zn)$ have been obtained up to the present.

The stored locus information function $t=G(Z)$ provides following function, by expansion or compression on the time axis and by parallel displacement:

$$t = A \times G(Z) + B = G'(Z) \tag{5}$$

The coefficients A, B in the equation (5) are suitably determined to minimize the error from n sets of in-focus position data $(t0, Z0), (t1, Z1), \ldots, (tn, Zn)$. The error E can be represented by the following equation:

$$E = \sum_{i=0}^{n} (Ei)^2 = \sum_{i=0}^{n} (ti - A \times G(Zi) - B)^2 \tag{6}$$

As the condition for minimizing the error E with respect to the variable A, B, there are taken two first-order partial differential equations:

$$\Delta E/\Delta A = \Delta E/\Delta B = 0$$

These equations can be rewritten as follows with respect to the coefficients A and B:

$$A = \frac{(n+1) \times \sum_{i=0}^{n} \{ti \times G(Zi)\} - \sum_{i=0}^{n} ti \times \sum_{i=0}^{n} G(Zi)}{(n+1) \times \sum_{i=0}^{n} \{G(Zi)\}^2 - \left(\sum_{i=0}^{n} G(Zi)\right)^2} \tag{7}$$

$$B = \frac{\sum_{i=0}^{n} ti - A \times \sum_{i=0}^{n} G(Zi)}{n+1}$$

If monotonously increasing locus information as shown in FIG. 20 is stored in the form of FIGS. 22, 23A or 23B, G(Zi) in the equations (6), (7) can be determined from the following interpolation equation:

$$G(Zi) = \{G(Zj+1) - G(Zj)\} \times \frac{Z_i - Z_j}{Z_{j+1} - Z_j} + G(Zj) \qquad (8)$$

wherein j is the number of lens position closest to the lens position Zi ($Zj \leq Zi \leq Zj+1$ or $Zj \geq Zi \geq Zj+1$).

Compensated locus information with new coefficients A, B can be obtained at every time tn by these equations (5)–(8). However, at time t0 when only one set of in-focus position data is available, the coefficient A is set as 1 and the compensation is made by the coefficient B only.

Also when G(Z) is not monotonously increasing but is a multi-value function, G(Zi) can still be determined from the equation (8), since the lens position number j close to the lens position Zi can be determined from the similarity between the stored in-focus positions and the locus information. As an example, in case the locus information G(Z) is a two-value function with respect to the lens position Z, an in-focus position Zi may be positioned between a set of locus information data $Z_n$, $Z_{n+1}$, or $Z_m$, $Z_{m+1}$. Out of these two sets with times tn, tm respectively corresponding to Zn, Zm, there is selected a set of which time is larger than the time tc corresponding to Zc in the data set (Zc, Zc+1) selected for the preceding in-focus position $Z_{i-1}$ and is smaller of the two. Thus, if tc is at a time tp, a data set (Zn, Zn+1) is selected for the in-focus position Zi. If tc is at Tq, there is selected the data set (Zm, Zm+1). Thus, even when the locus information has plural values with respect to the lens position Z, there can be selected only one set of locus information (Zj, Zj+1) on both sides of the in-focus position Zi, by selecting a suitable criterion.

Consequently the compensated locus information G'(Z) determined by the equations (5) to (8) provides, as shown in FIG. 18, a function minimizing the error with respect to the plural in-focus position data (t0, Z0), (t1, Z1), ..., (tn, Zn).

In the equations (6) and (7), the summation is calculated from i=0 to i=n, but it is also possible to calculate said summation from i=n−m to i=n, employing only m data in the past, or to calculate said summation only employing data within a predetermined past period T prior to the present.

Such method of calculation, correcting the locus information employing solely the data close to the present time, allows to reduce the correction error even for an object of varying speed.

In the focus detecting operation, it is difficult to constantly maintain the object in the focus detecting area, and the focus detection is made on the background or becomes impossible if the object eventually runs out of the focus detecting area. Thus, as shown in FIGS. 26 and 27, the in-focus position data (t0, z0), (t1, Z1), ..., (tn, Zn) may show sudden change.

If the focus detection becomes impossible at a time tn as shown in FIG. 26, so that the in-focus position Zn cannot be obtained, the compensated locus information obtained at the time tn − 1 may be employed in continuation for the lens drive control at the time tn and thereafter.

Figure 27:
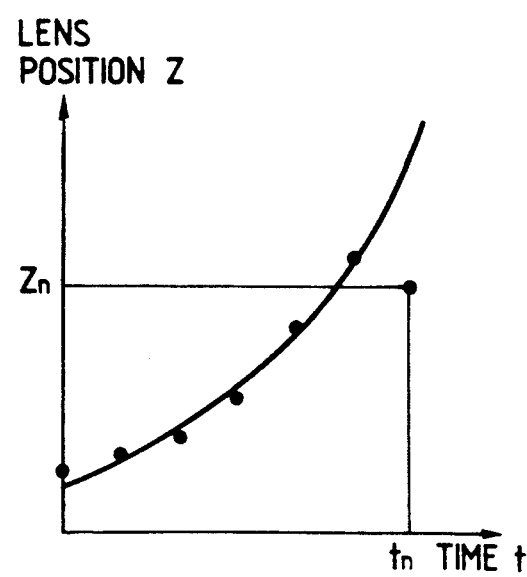

On the other hand, if an apparently erroneous in-focus lens position Zn is obtained at a time tn as shown in FIG. 27, the equation (6) will provide a large error E at said time tn. Consequently, if said error E exceeds a certain predetermined amount, the compensated locus information obtained at the time tn−1 may be used in continuation for the lens drive control at the time tn and thereafter. It is also possible, if the difference between the in-focus position Zn obtained at the time tn and the lens position at said time tn estimated from the compensated information stored at the time tn−1 exceeds a predetermined value, to use the compensated locus information obtained at the time tn−1 in continuation for the lens drive control at the time tn and thereafter.

In the foregoing description, the compensated locus information is obtained by a compression, an expansion and a parallel displacement of the locus information function on the time axis because the error in the locus information for a moving object is considered to principally arise from the difference in the moving speed of the object. It is also possible to obtain the compensated locus information by applying compression, expansion and parallel displacement to the locus information on the lens position axis, in order to correct the error resulting from difference in object distance (for example, in the shortest object distance S in FIG. 4), or to use both corrections at the same time or alternately.

In general, the compensation on the lens position axis becomes effective when the object distance becomes shorter. Consequently such compensation on the lens position axis may be employed only when the object is positioned at a short distance.

In the following there will be explained lens drive controller means 7. The lens drive controller means effects the drive control, based on the compensated locus information determined by the locus compensator 13 and the lens position information, in such a manner that the lens position-time relationship matches the compensated information as shown in FIG. 18. For example, when the compensated locus information G'(Z) is obtained at time tn according to the equations (5) to (8), the lens position Zx according to said compensated locus information at a time tx after the time tn is given by the following equation:

$$Zx = (Zr+1 - Zr) \times \frac{t'x - tr}{tr+1 - tr} + Zr$$

wherein $$t'x = (tx - B)/A$$

$$tr \leq t'x \leq tr+1 \qquad (9)$$

Figure 28:
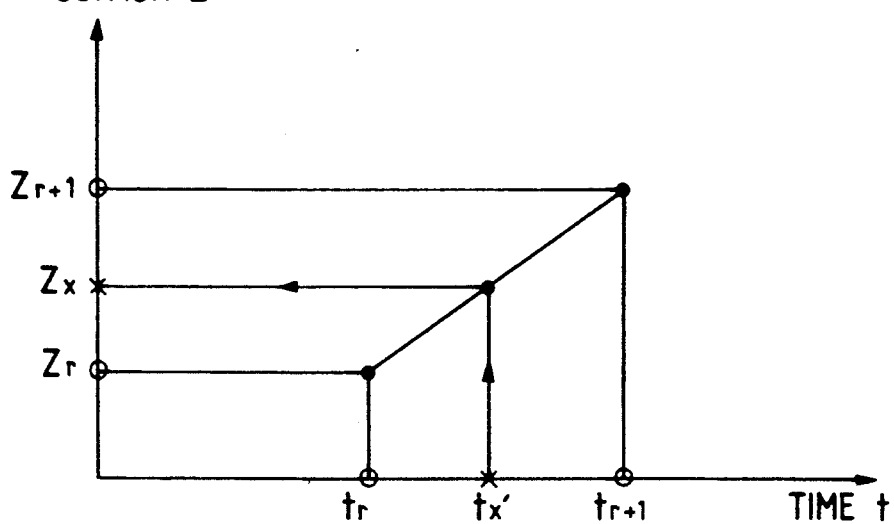
FIG. 28 is a chart showing another process in the locus compensating means.
Figure 25:
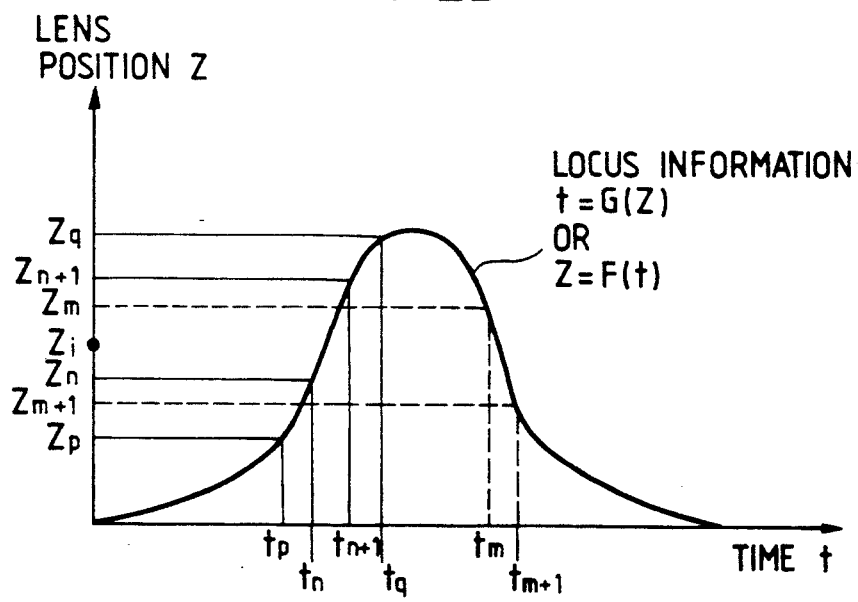
FIG. 25 is a chart showing another process in the locus compensating means.

According to this equation (9), the lens positions $Z_r$, $Z_{r+1}$ are obtained, as shown in FIG. 28, from the stored locus information, corresponding to $t_r$, $t_{r+1}$. Thus the lens position is controlled so as to reach $Z_x$ at an arbitrary time $t_x$ after the time $t_n$.

Thus, as explained above, the automatic focusing device shown in FIG. 17 drives the phototaking lens so as to be constantly focused to the object, whereby the user can obtain a well focused photograph.

Figure 29:
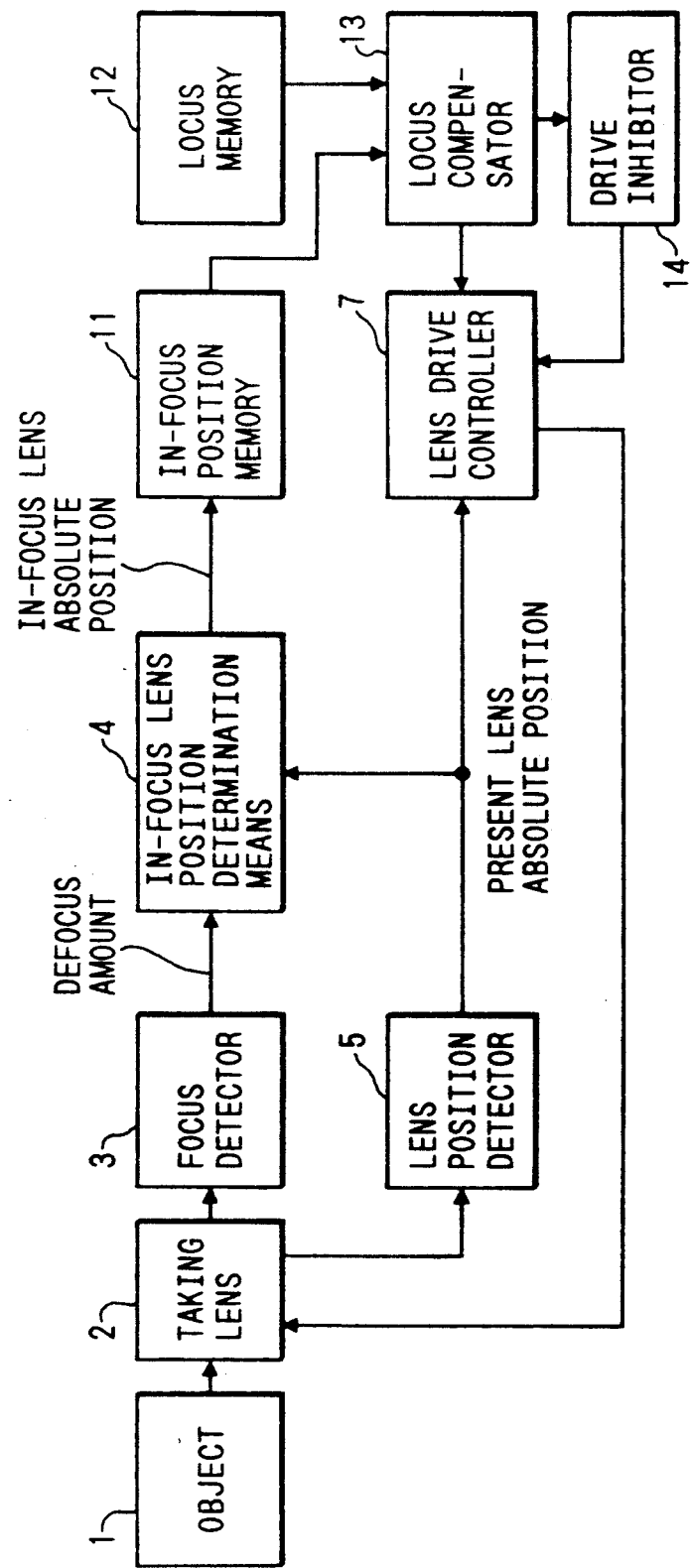
FIG. 29 is a block diagram of a sixth embodiment of the present invention.

FIG. 29 shows a sixth embodiment corresponding to an improvement of the embodiment shown in FIG. 17 and including drive inhibitor means 14.

The drive inhibitor means 14 monitors the error E generated by the locus compensator 13 according to equation (6), and enables or inhibits the function of the lens drive controller 7 according to the following criteria:

E/N≧H function inhibited

E/N<H function enabled          (10)

wherein N≧3.

In the relations (10), N is the number of summed terms in the equation (6) (N=n+1 in case i=i to n), and N is a predetermined value.

If the error E is large, namely if the movement of the object does not match the stored locus information, the control based on the relations (10) inhibits the lens drive control based on the compensated locus information, thereby avoiding unnecessary lens drive.

It is also possible to stabilize the operation by forming a hysteresis, by selecting a predetermined value H1 for inhibiting drive and a predetermined value H2 for enabling the drive so as to satisfy a relation H1<H2 in (10). Also the response can be improved by limiting the number of summed terms in the calculation of error E to a predetermined number of data from the present time. Furthermore, during the above-mentioned inhibition, there may be conducted ordinary automatic focusing based on the defocus amount.

Also the start of lens drive based on the compensated locus information can be controlled by inhibiting the lens drive in case N is equal to or less than 3 in the relations (10). The probability of focusing is improved further, since the lens drive based on the compensated locus information is started only after the matching between the movement of object and the stored locus information is confirmed.

Furthermore, following criteria may be added to the conditions (10): drive inhibited if A>Ah, A<Al,          (11)

B>Bh or

B<Bl drive enabled in other cases

In said relations (11), Ah, Al, Bh and Bl are predetermined values satisfying:

Ah>1>Al>0, Bh>0>Bl.

For example there can be selected Ah=2, Al=1/2, Bh=100 ms and Bl=−100 ms. The addition of such conditions allows to identify a low matching of the locus information if excessively large compensations are applied to the locus information. In such case the lens drive based on the compensated locus information is inhibited to avoid unnecessary lens drive.

Figure 30:
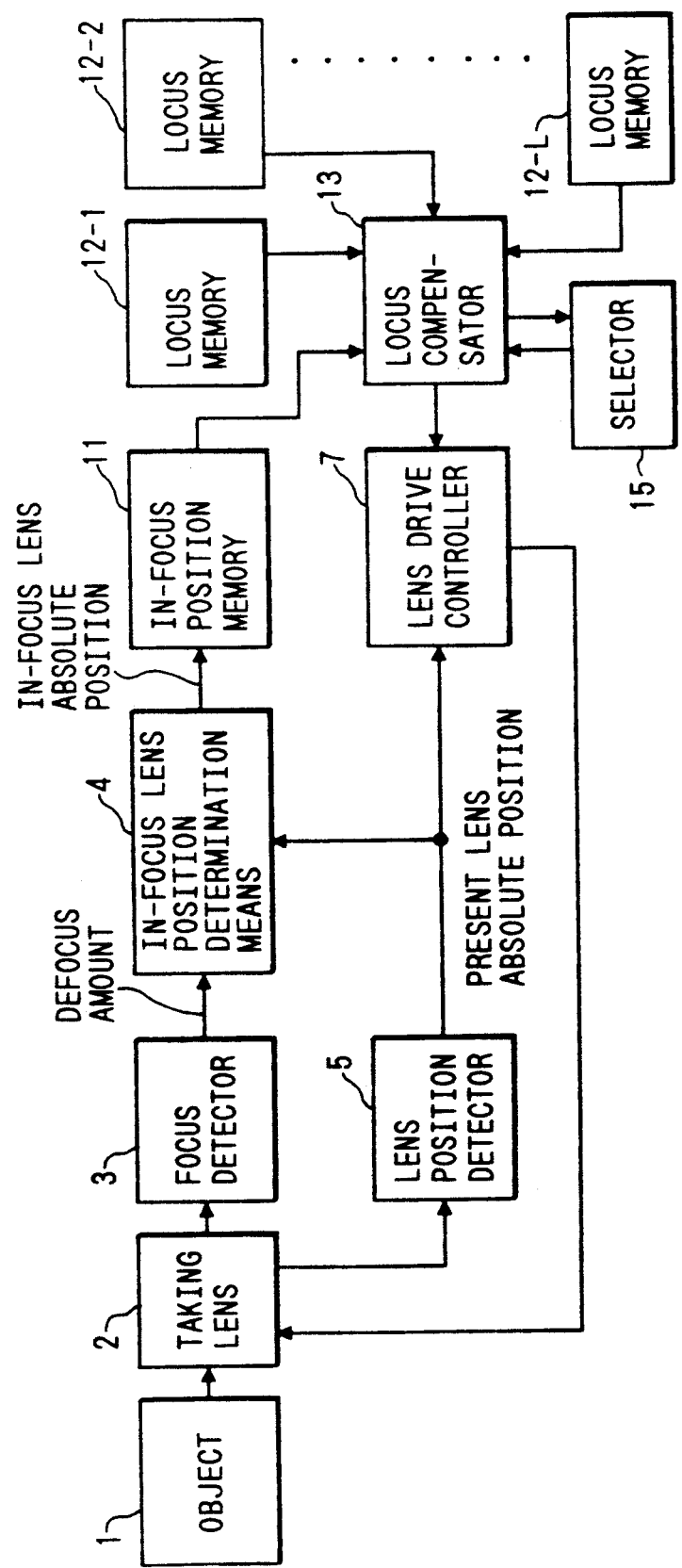
FIG. 30 is a block diagram of a seventh embodiment of the present invention.

FIG. 30 shows a seventh embodiment constituting an improvement on the embodiment shown in FIG. 17 and additionally containing plural (L) locus memory means 12-1–12-L and selector means 15.

Figure 31A:
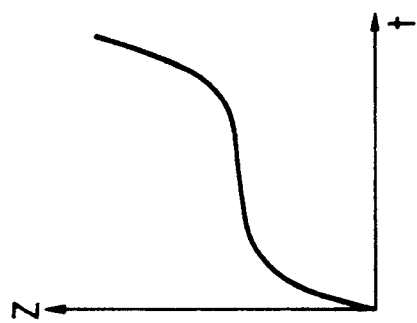
FIGS. 31A, 31B, 31C, 32A, 32B and 32C are charts showing the process in plural locus memory means in the circuit shown in FIG. 30.
Figure 31B:
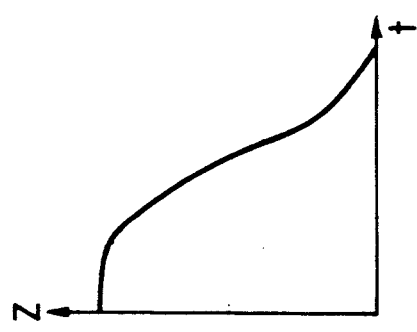
Figure 31C:
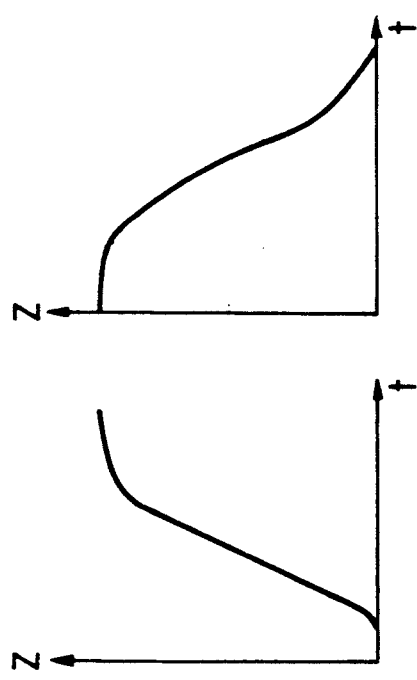

The plural locus memory means 12-1–12-L respectively store different locus information as shown in FIGS. 31A, 31B and 31C, and the locus compensator 13 effects compensation as indicated by the equations (5)–(8) on each locus information. The errors E1–EL obtained from the equation (6) on said locus information are supplied to the selector means 15, which extracts the minimum error Ej and selects the compensated locus information providing said error Ej, from the plural compensated locus information determined by the locus compensator 13. The lens drive control is executed based on thus selected compensated locus information.

Figure 32A:
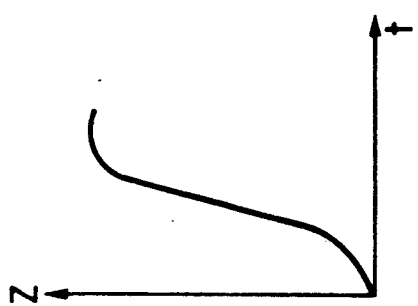
Figure 32B:
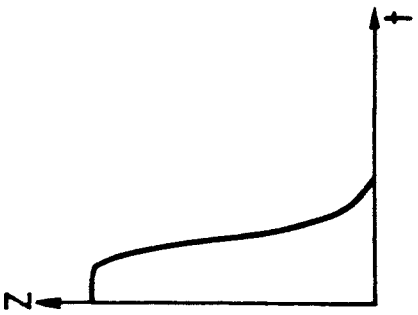
Figure 32C:
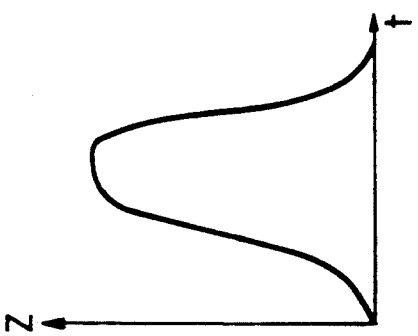

This embodiment is effective in simplifying the process in the locus compensator, by decomposing locus information having plural values with respect to the lens position Z into plural parts of mono-value locus information and storing said parts respectively in the plural locus memory means 12-1–12-L. For example, the locus information shown in FIG. 32C can be decomposed into those shown in FIGS. 32A and 32B. In such decomposition, resulting parts may have common portions to a certain extent.

As explained above, the embodiment shown in FIG. 30 further improves the probability of focusing, since compensated locus information closest to the actual object movement is selected from plural information and is used for the lens drive control.

In the foregoing 5th to 7th embodiments, the drive control of the phototaking lens 2 is executed according to the compensated locus information while the in-focus lens position information or the defocus amount is used for compensating the locus information, but it is also possible to switch the conventional lens drive control based on the defocus amount and the lens drive control embodying the present invention.

Also in the embodiments shown in FIGS. 17, 29 and 30, the defocus amount of the phototaking lens 2 is detected by the TTL method utilizing the focus detector means, but it is also, possible to directly measure the object distance as, for example, by a trigonometric method.

Also in comparison with the conventional method of lens drive control directly based on the stored locus information, the 5th to 7th embodiments of the present invention, adapted for compensating the stored locus information with the in-focus position information and effecting the lens drive control based on thus compensated locus information, reduce the focus error even when the conditions such as distance or speed of the moving object vary, thereby realizing an automatic focusing device capable of adapting to various moving objects.

Figure 33:
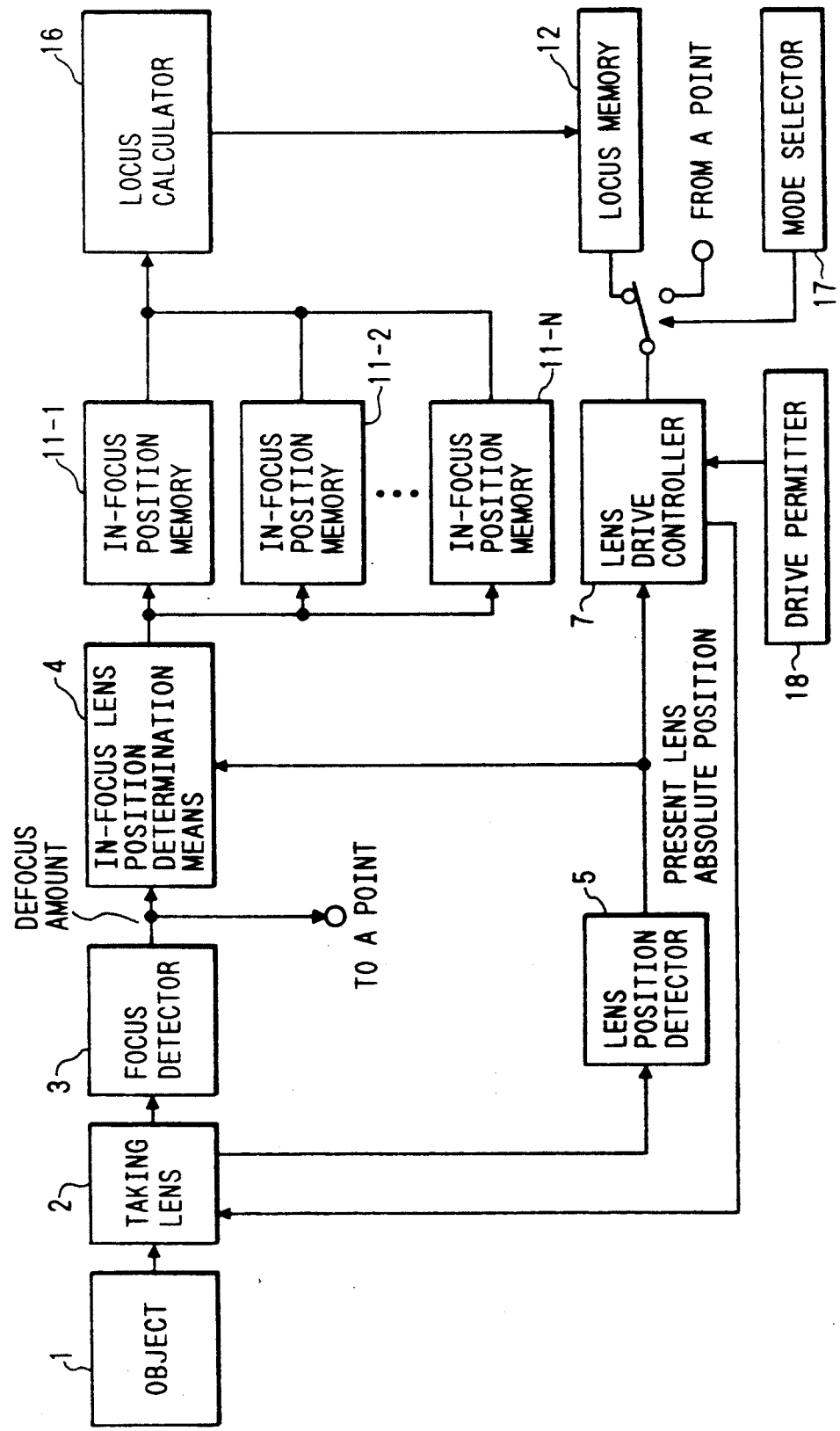
FIG. 33 is a block diagram of an eighth embodiment of the automatic focusing device of the present invention.

FIG. 33 is a block diagram of an 8th embodiment of the automatic focusing device of the present invention applied to a camera.

Referring to FIG. 33, the light beam from an object 1 is transmitted by a phototaking lens 2 and forms an image of the object on a film plane. The light beam is also split, by a known sub-mirror, from the photographing optical axis and is guided to focus detector means 3 positioned for example at the bottom of the camera. Said focus detector means 3 is composed of a known focus detecting optical system an image sensor and a focus detecting calculation unit, and, upon receiving the light from the object 1, detects the direction and amount of deviation between the object image plane and the film plane (hereinafter collectively called defocus amount). Said defocus amount is given at intervals, because the focus detector means 3 requires a charge accumulating time for the image sensor and a calculating time for focus detection. Said interval becomes longer when a photographing operation is conducted, since the focus detection cannot be executed during said operation.

Lens position detector means 5, for detecting the absolute position of the phototaking lens 2, (for example, represented by the lens shifting distance from a reference position of the lens 2 focused at the infinite object distance) is composed of an encoder for generating a predetermined number of pulses corresponding to a predetermined amount of movement of the lens 2, a counter for adding or subtracting the output pulses of said encoder according to the lens moving direction, and reset means for initializing said counter. The content of said counter provides information corresponding to the absolute position of the phototaking lens 2, this being accomplished by resetting said counter after retracting the lens 2 to a position focused to the infinite distance at the start of power supply to the automatic focusing device, and thereafter counting the output pulses of said encoder.

In-focus lens position determining means 4 converts the defocus amount generated by the focus detector means 3 into a moving distance of the lens 2, and adds said moving distance corresponding to the defocus amount to the lens position at the generation of said defocus amount, thereby determining a lens position for focusing the phototaking lens 2 to the object at the current moment (hereinafter called in-focus lens position). If the phototaking lens is moving in the course of focus detecting operation (charge accumulating time of image sensor and calculating time) of the focus detector means 3, a compensation corresponding to such lens movement is added to the defocus amount or to the in-focus lens position.

Figure 36:
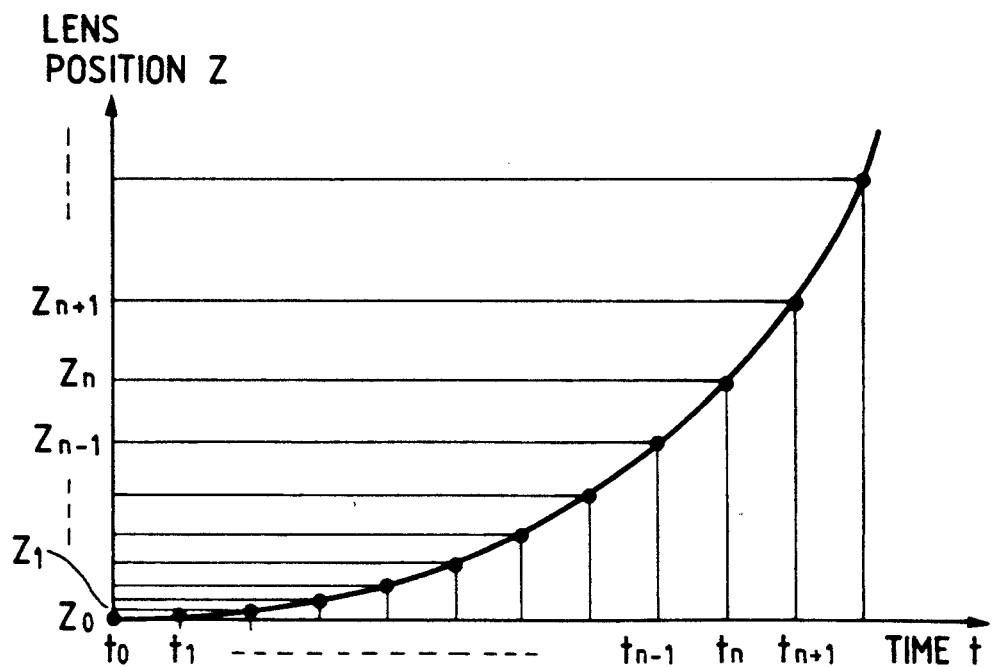
FIGS. 36 and 37 are charts showing the process in the in-focus position memory means.

In-focus position memory means 11-1-11-N store plural in-focus position data, generated intermittently by the in-focus lens position determining means 4, respectively paired with data of generating time. When in-focus position data $Z_0, Z_1, Z_2, \ldots, Z_{n-1}, Z_n$ are generated at times $t_0, t_1, t_2, \ldots, t_{n-1}, t_n$ as shown in FIG. 36, the time t and the in-focus position Z are stored, as shown in FIGS. 19A and 19B, in a rewritable memory such as a RAM, with respective address numbers starting from reference addresses Y, W.

Figure 34:
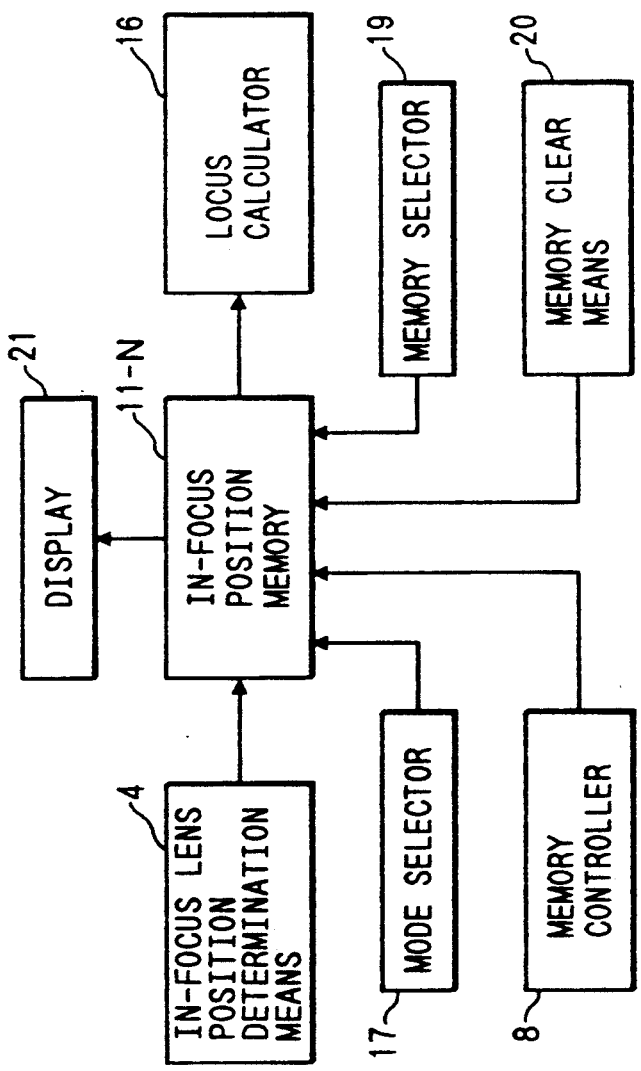
FIG. 34 is a block diagram of one of in-focus position memory means in FIG. 33.

In the following the function of the in-focus position memory means 11-1-11-N will be explained in detail, with reference to FIG. 34, which is a block diagram of one of said plural in-focus position memories 11-1-11-N.

Mode selector means 17 selects either a memory mode for storing plural in-focus lens positions and times generated time-sequentially in the in-focus position memory means 11-N, or a locus drive mode for effecting the drive control for the phototaking lens 2 by means of the lens drive controller 7 according to the locus information from the locus memory means 12. The memory operation by the in-focus position memory means 11-N is enabled only when the memory mode is selected by the mode selector 17.

Memory selector means 19 selects, among plural in-focus position memory means 11-1-11-N, one memory means 11−k (k=1−N) in arbitrary manner. Memory controller means 8 enables or disables the memory operation by the in-focus position memory means 11-k selected by the memory selector 19. Memory clear means 20 clears the content of the in-focus memory means 11-k selected by the memory selector 19. Display means 21 displays the content stored in the in-focus memory means 11-k selected by the memory selector 19.

Figure 37:
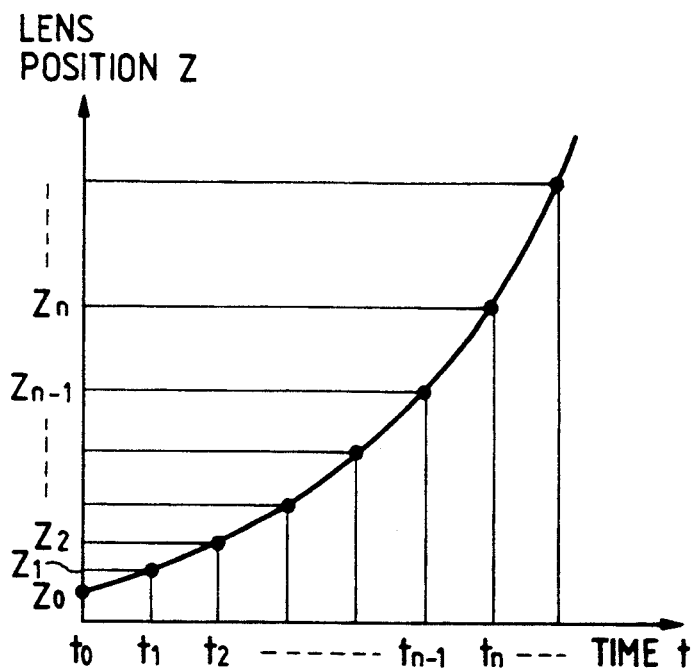

In the above-explained structure, when the memory mode is selected by the mode selector 17 and an in-focus position memory means 11-k is selected by the memory selector 19, the display means 21 displays the content stored therein and said content may be renewed or cleared by the memory controller 8 and the memory clear means 20. For example, when the stored content is renewed by the memory controller 8, the in-focus position memory means 11-k stores the in-focus position data $Z_0, Z_1, Z_2, \ldots, Z_{n-1}, Z_n$ generated by the in-focus lens position determining means 4 in respective pairs with time data as shown in FIG. 37, starting from a time (t0=0) when the memory operation is enabled by the memory controller 8.

The memory selector 19 may effect the selecting operation manually, or, in case the memory content is renewed by the memory controller 8, may automatically select a next in-focus position memory at the completion of such renewal.

Again referring to FIG. 33, locus calculator means 16 effects a statistical processing on the data stored in an in-focus position memory among the plural in-focus position memories 11-1-11-N, and of which content has not been cleared, thereby calculating locus information representing as a function of time the in-focus lens position Z for focusing the phototaking lens 2 to a particular moving object.

Figure 38:
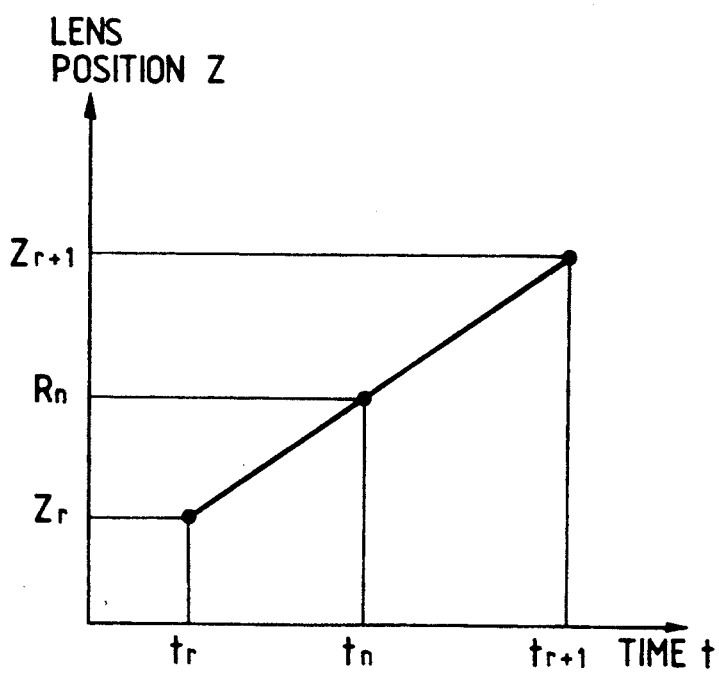
FIGS. 38 and 39 are charts showing the process in locus calculating means.

In the following there will be explained the function of the locus calculator 16 in detail, with reference to FIGS. 38 and 39.

At first, in order to convert the data stored in an in-focus position memory means into data of a time sequence $(T_0, T_1, \ldots, T_{n-1}, T_n, \ldots)$, the locus calculator 16 effects the calculation indicated by the following formula, thereby determining the in-focus position data $P_0, P_1, \ldots, P_{n-1}, P_n, \ldots$ corresponding to the times $T_0, T_1, \ldots, T_{n-1}, T_n, \ldots$;

$$P_n = (Z_{r+1} - Z_r) \times \frac{T_n - t_r}{t_{r+1} - t_r} + Z_r \qquad (12)$$

wherein n is a positive integer.

In the equation (12), the times $t_{3+1}, t_r$ are so selected as to satisfy a relation:

$$t_r \leq T_n \leq t_{r+1}$$

and $P_0 = Z_0$.

In this manner, based on the data stored in each in-focus position memory 11-k which has not been cleared, there are determined the in-focus positions $P_0(k), \ldots, P_n(k), \ldots$ corresponding to the times $T_0, T_1, \ldots, T_{n-1}, T_n, \ldots$ for each value k representing an unclear memory.

Then, an average in-focus position $R_n$ of plural in-focus position data $P_n(k)$ corresponding to the contents of plural in-focus position memories 11-k for a same time $T_n$ is determined by the following equation:

$$R_n = \left[ \sum_k \{P_n(k)\} \right] / m \quad n = 0, 1, \ldots \qquad (13)$$

wherein k is selected for the in-focus position memories of which contents have not been cleared, and m is the number of such uncleared memories, so that $k \leq m$.

Figure 39:
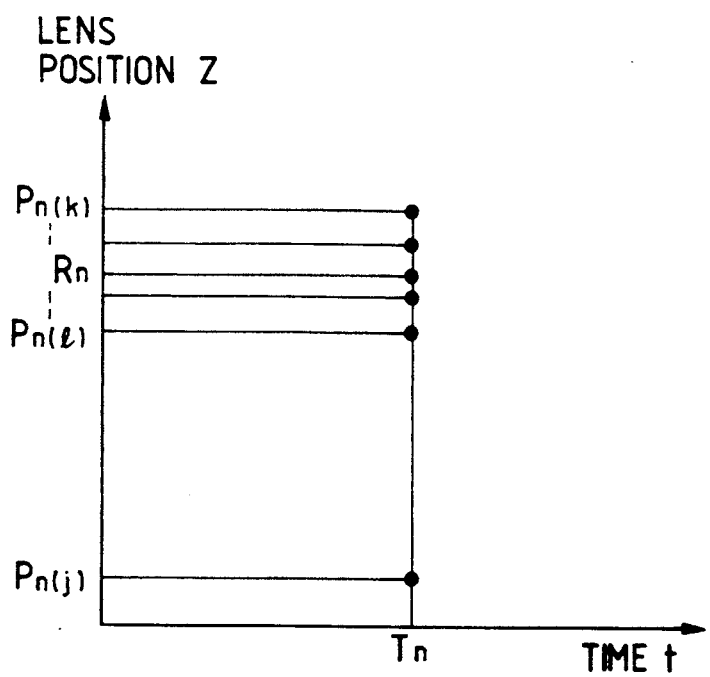

If a value $P_n(j)$ is significantly deviated from the average $R_n$ as shown in FIG. 39, such value may be eliminated and the calculation of the equation (13) may be conducted again after the adjustment of the range of k and the value m.

For example, an ineffective value can be eliminated by the following condition based on the initially obtained average $R_n$:

$$|R_n - P_n(k)| \geq H \text{ ineffective value} \qquad (14)$$

wherein H is a predetermined constant.

As the in-focus position data $P_n(k)$ will not fluctuate too much for similar moving objects, the reliability by averaging is further improved by eliminating the ineffective data by the above-explained process.

Figure 40:
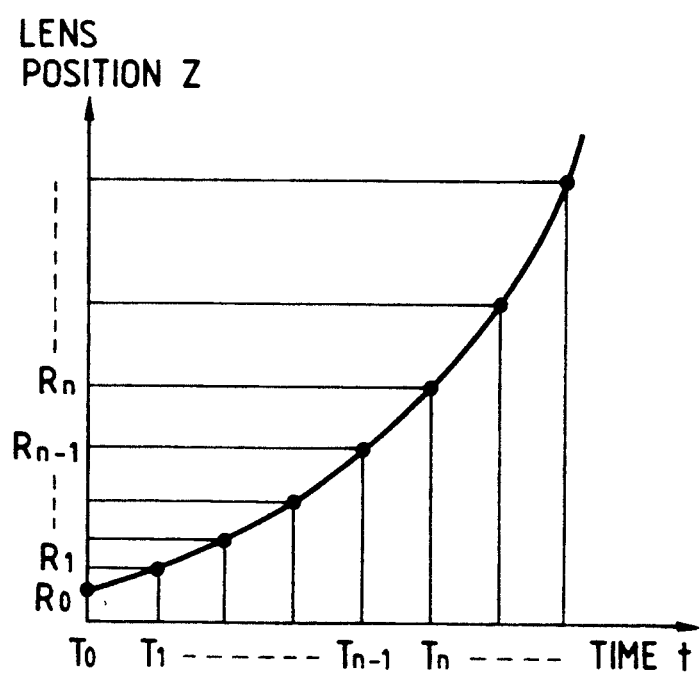
FIG. 40 is a chart showing the process in locus memory means.

Thus the locus calculator 16 can determine the locus information, namely the in-focus positions $R_0, \ldots, R_n, \ldots$ respectively corresponding to the times $T_0, T_1, \ldots, T_{n-1}, T_n, \ldots$ as shown in FIG. 40.

The locus memory means 12 stores the locus information obtained by the locus calculator 16.

Lens drive controller 7 effects the drive control for the phototaking lens according to the locus information stored in the locus memory means 12, or based on the in-focus position detected by the in-focus lens position determinating means 4 (or defocus amount detected by the focus detection means 3) and the lens position information generated by the lens position detection means 5. The aforementioned mode selector means 17 selects whether the lens drive control by the lens drive controller 7 is based on the locus information of the locus memory means 12, or on the information of the in-focus lens position determining means 4 and the lens position detector means 5.

Thus, when the locus drive mode is selected by the mode selector means 17, the lens drive controller 7 effects the lens drive control based on the locus information of the locus memory means 12, in such a manner that the position-time relationship of the phototaking lens matches the locus information as shown in FIG. 40. Since the locus information as shown in FIG. 40 is non-continuous, the data between the points can be determined by suitable interpolation.

Also when the memory mode is selected by the mode selector means 17 and a memory operation is conducted by the in-focus position memory means 11-N, lens drive control may be conducted by the lens drive controller 7 based on the in-focus position such that the position of the phototaking lens matches the in-focus position as in conventional automatic focusing control. Alternatively, the lens drive control by the lens drive controller 7 may be prohibited. The former method has an advantage of not easily becoming incapable of focus detection, since the phototaking lens is driven to follow the object between the detections of in-focus position, or in overlapping with the detection of the focus position. On the other hand, the latter method has an advantage of more precise measurement of the in-focus position, since the interval between the detections of focus detection in short, as the lens is not driven.

The actual lens driving operation by the lens drive controller 7 is further controlled by the selection of drive enabling or disabling by drive permitter 18.

Figure 35:
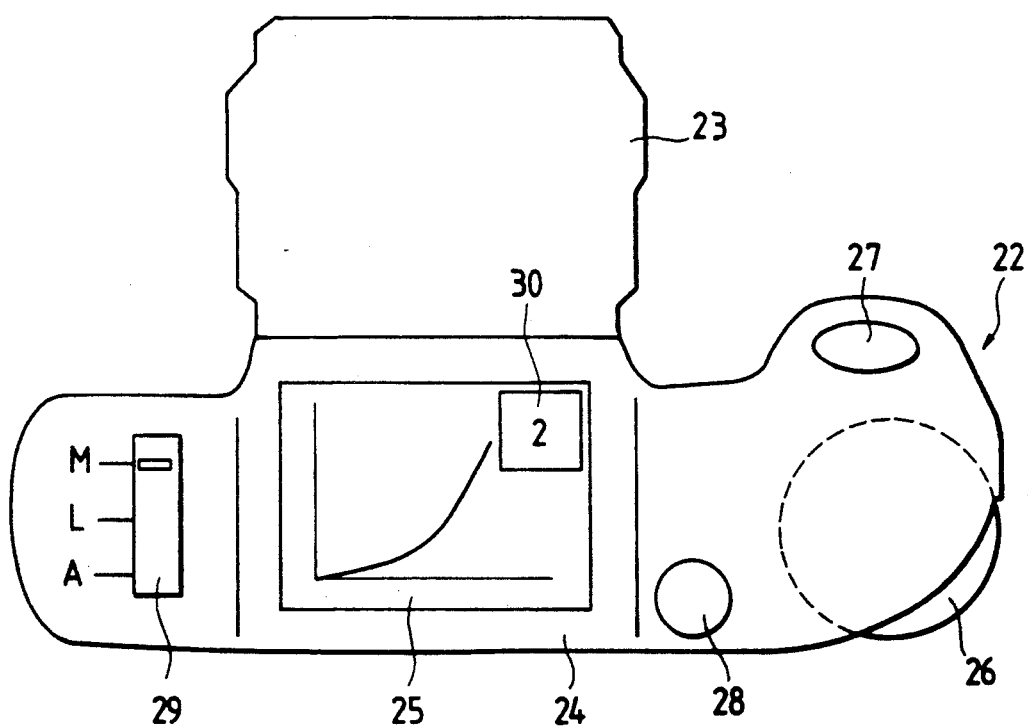
FIG. 35 is an external view of a camera in which the present invention is applied.

In the following there will be explained the function and the operating method of the automatic focusing device of the present invention, by an embodiment thereof applied to a camera as shown in FIG. 35.

FIG. 35 is a plan view of a single-lens reflex camera, wherein a lens 23 is mounted on a body 22 which is equipped with a liquid crystal display panel 25 (display means 21) on a pentagonal prism unit 24. On the upper right face of the body there are provided a command dial 26 (memory selector 19), a shutter release button 27 (memory controller 8, drive permitter 18), and a cancel button 28 (memory clearing means 20). On the upper left face of the body there is provided a mode selector 29 (mode selector means 17). Other means shown in FIG. 33 are constituted by a CPU, memories etc. incorporated in the camera body.

The mode selector 29 can select a memory mode M, a locus drive mode L or a normal AF mode A. These modes will be explained in the following.

Normal AF mode (A)

In this mode the in-focus position memory means 11 does not execute the memory operation of the in-focus position data, and the lens drive controller 7 executes the lens drive control based on the in-focus position information and the lens position information. In other works, this mode is a conventional auto-focusing mode. The lens drive is enabled when the shutter release button 27 is full- or half-pushed, but is disabled when said button is not actuated. An exposure control operation on the photographic film is conducted when said button is fully pushed. In this mode, the cancelling button 28 does not function, and the command dial 26 does not serve as the memory selector 19. Also the liquid crystal display panel 25 does not serve as the display means 21 but is used for displaying other information, such as of light metering.

Memory mode (M)

In this mode the memory operation of the in-focus position data can be executed by the in-focus position memory means 11. When the camera is switched to this mode from another, the command dial 26 (memory selector 19) is reset to select the in-focus position memory means 11-1, and a selection number "1" is displayed in a part 30 of the liquid crystal display panel 25. Then the direction of the camera is determined so as that the focus detection means 3 can catch a desired moving object, and, while said object is traced, the shutter release button 27 is half-pushed at a suitable moment, for example when the object passes a predetermined point. Starting from said moment, the in-focus position memory means 11-1 starts the storage of the in-focus position data. The storage operation is terminated when the shutter release button 27 is released again or when the memory becomes full, and the in-focus position data $Z_0, Z_1, Z_2, \ldots, Z_{n-1}, Z_n, \ldots$ and the times $t_0, t_1, t_2, \ldots, t_{n-1}, t_n, \ldots$ stored in the in-focus position memory 11-1 are displayed on the liquid crystal display panel 25 in a manner as shown in FIG. 36. If the operator is not satisfied with the displayed data, for example when the data are not uniform, he may cancel the data stored in the in-focus position memory 11-1 by depressing the cancelling button 28. In this state any in-focus position memory can be arbitrarily selected by turning the command dial 26, whereupon the number displayed in the part 30 of the display panel 25 is accordingly changed. After said memory selection, the storage operation can be made as explained above. In this manner the storage operation can be executed plural times for a moving object.

Locus drive mode (L)

In this mode the lens drive can be executed according to the locus information stored in the locus memory means 12. When the camera is switched from the mode M to this mode, the locus calculator means 16 calculates a locus from plural data stored in an in-focus position memory 11 which is effective at this moment. Said locus information is stored in the locus memory 12 and is displayed on the display panel 25. The lens drive is enabled when the operator half- or full-pushes the shutter release button 27, tracing the moving object. The lens drive based on the locus information may be started along the locus shown in FIG. 40, taking the point of drive enabling as the reference time ($t_0=0$), or starting from an in-focus position close to the point of drive enabling.

In this mode the cancelling button 28 does not function, and the command dial 26 does not serve as the memory selector means 19. On the display panel 25, there may be displayed the locus information or other information, for example of light metering, by the manipulation of the command dial 26.

Thus the operator can always maintain a focused state to the moving object and obtain a focused photograph, by storing the locus plural times on the actual object in the mode M selected by the mode selector 29, and then photographing the object in the course of a locus drive in the mode L.

The present invention is not limited to the foregoing embodiment. For example, there may be provided plural locus memory means 12 corresponding to the plural in-focus position memory means 11-N and the memory clearing means 20 may be so constructed as to clear the locus information by selecting one of the plural locus memory means.

In the foregoing description, the defocus amount of the phototaking lens 2 is detected by the TTL method with the focus detection means, but it is also possible to directly measure the object distance for example by a trogonometric method.

The automatic focusing device of the 8th embodiment for effecting the drive control for the phototaking lens according to a locus information stored in advance does not require a special device for the entry of the locus information, and provides a simple method of easy entry even for an unskilled operator, as the locus information is stored by the direct focus detection on the actual moving object.

Also since each locus information is determined from statistical processing of the data of plural in-focus positions, exact information can be determined even if each measurement of in-focus position contains certain error.

Furthermore, said device is switchable to conventional auto focusing control directly utilizing the output of the focus detecting means for determining the in-focus position, and the operator can select an optimum drive mode according to the situation. Thus there can be provided an automatic focusing device providing little focusing error in overall performance and capable of flexibly handling various moving objects.

In the following there will be explained a ninth embodiment of the present invention, with reference to FIGS. 41 to 47.

Figure 41:
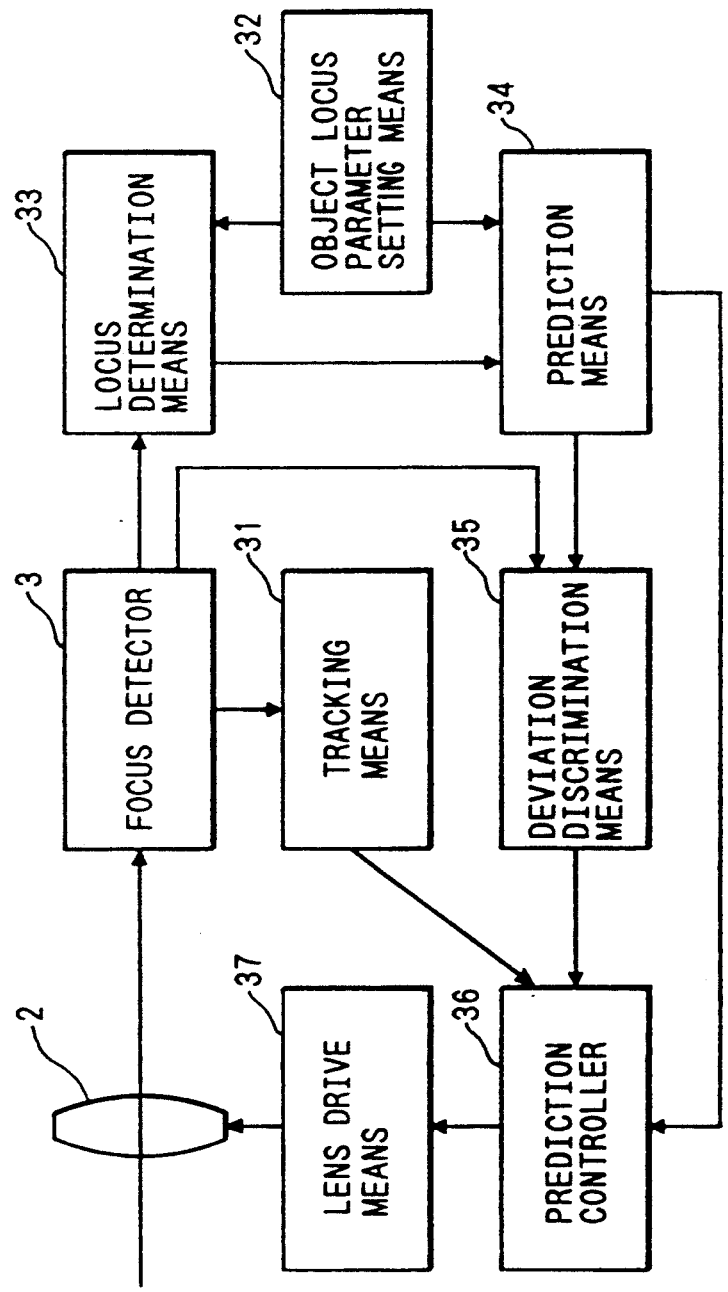
Figure 42:
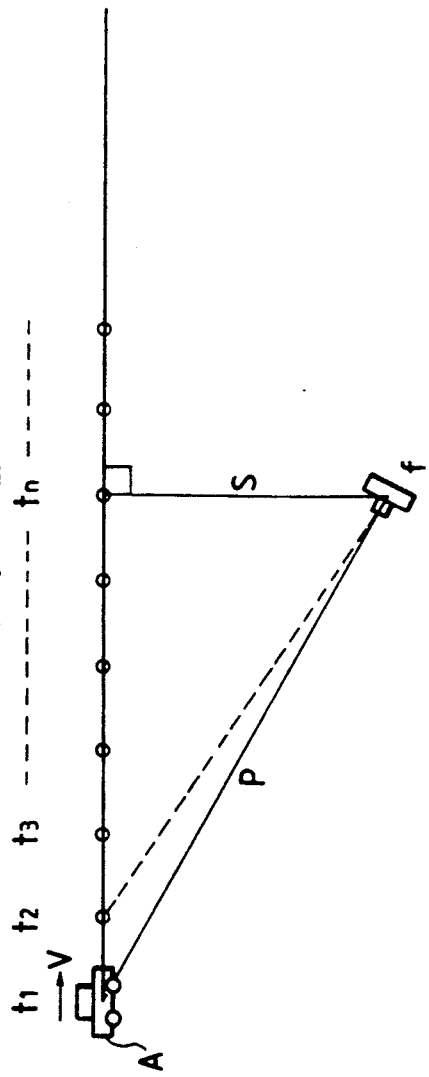

FIG. 41 is a block diagram of the present embodiment, and FIG. 42 is a view showing the relationship between the camera and an object passing in front of the camera with a constant speed.

In FIG. 41, focus detector means 3 detects the defocus amount $Df_n$, indicating the focusing state of the phototaking lens (distance to the in focus point of the lens) at a time $t_n$.

Tracking means 31 discriminates whether the object is moving, based on past plural defocus amounts obtained by the focus detector means 3, and, if the object is moving, calculates a defocus amount $P_n$ corresponding to the object movement in excess of the detected defocus amount (amount of movement of image plane from the preceding focus detection to the present focus detection; hereinafter called predicted defocus amount) by $P_n = Df_n + $ (preceding lens drive amount) $- Df_{n-1}$. The predicted defocus amount may also be determined by a method disclosed in the Japanese Laid-Open Patent Application No. 63-148218 of the present assignee.

In object locus parameter setting means 32, locus parameters consisting of the object speed V, shortest distance S to the object path and focal length f of the phototaking lens, as shown in FIG. 42, are set in advance, or selected from plural parameters by external setting operations. Said locus parameters are representative values determined for certain kinds of objects such as in sports or automobile racing.

Locus determining means 33 receives the defocus amount signal from the focus detection means 3 and the parameter signal from the object locus parameter setting means 32, and sends a signal indicating the locus of object movement to prediction means 34.

Prediction means 34 receives the locus signal from the locus determining means 33 and the locus parameter signal from the object locus parameter setting means 32, and sends an estimation signal predicting the object locus to deviation discrimination means 35 and prediction control means 36.

The deviation discrimination means 35 compares the defocus amount signal output from the focus detection means 3 with the estimation signal from the prediction means 34, and outputs a non-deviation signal if both signals are within a predetermined tolerance, or a deviation signal otherwise.

In response to the deviation signal from the deviation discrimination means 35, the prediction control means 36 control the lens drive means 37 based on the estimation signal from the prediction means 34. Also in response to the non-deviation signal, the control means 36 controls the lens drive means 37 based on the predicted defocus amount signal from the tracking means 31.

In the following there will be explained a normalizing process for the movement locus signal for the object A, generated by the locus determining means 33, reference being made to FIGS. 42 to 46.

In case of photographing the object A moving at a constant speed as shown in FIG. 42, the locus is determined singly if three parameters of the object speed V, shortest distance S to the object locus and focal length f of the lens (hereinafter called locus parameters) are determined.

Figure 43C:
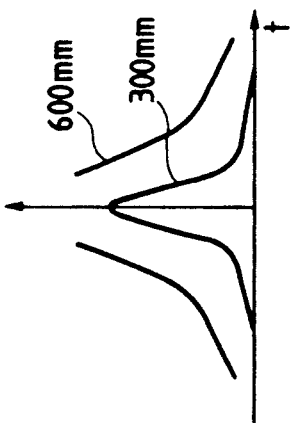
FIGS. 43A, 43B and 43C are charts showing the lens shifting amount as a function of time, depending on the object speed, shortest object distance at photographing and focal length of the lens.
Figure 43B:
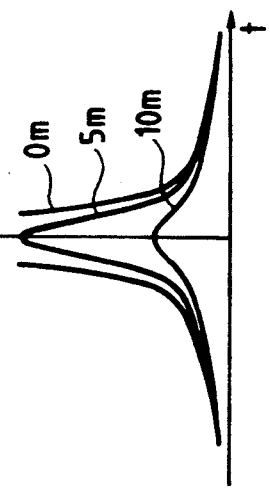
Figure 43A:
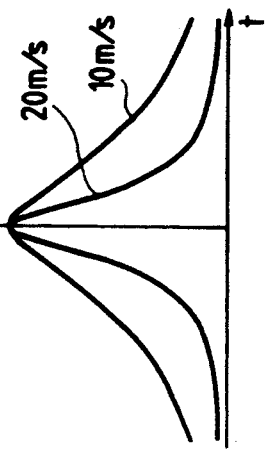

However the object locus varies as shown in FIG. 43A for different object speeds. Also the locus varies as shown in FIG. 43B or 43C respectively by the change in the shortest distance S to the locus or in the focal length f. FIGS. 43A to 43C indicate, in the ordinate, the lens shifting amount from a position focused to the infinite distance, as a function of time in the abscissa.

As shown in FIGS. 43A to 43C, the locus of the object A assumes various patterns by the changes in the locus parameters, and it is not possible to store all such locus parameters in the parameter setting means 32, or to store all the loci based on such parameters in the locus determining means 33. Consequently, the image plane moving speed is utilized for normalizing the loci.

From the situation shown in FIG. 42, the photographing distance P can be represented by the equation (15):

$$P = ((Vt)^2 + S^2)^{\frac{1}{2}} \qquad (15)$$

wherein the time t is taken as zero when the object is closest to the camera (P=S), V is the object speed, and S is the length of normal line to the locus in FIG. 42.

Also the following equation (16) can be obtained from Newton's lens equation and under a condition f<<S;

$$P \cdot x = f^2 \qquad (16)$$

wherein
x: lens shifting amount
f: focal length of lens.

From the equations (15) and (16), the image plane moving speed u can be represented by the following equation (17):

$$u = \frac{dx}{dt} = -\frac{f^2 V^2 t}{|Vt|^3 \left(1 + \frac{S^3}{V^3 t^3}\right)^{3/2}} \qquad (17)$$

This equation can be further transformed as follows:

$$u = -\text{sign}(t) \frac{f^2}{Vt^2 \left(1 + \frac{S^2}{V^2 t^2}\right)^{3/2}} \qquad (18)$$

wherein:

$$\text{sign}(t) = 1 \text{ for } t \geq 0$$
$$= -1 \text{ for } t < 0$$

Then the following equation (19) can be obtained by replacing the time t with $T=(V^{\frac{1}{2}}/f)t$:

$$u = -\text{sign}(t) \frac{1}{T^2 \left(1 + \frac{S^2}{Vf^2 T^2}\right)^{3/2}} \qquad (19)$$

This equation can be represented in general as follows:

$$u = -\text{sign}(t) \frac{1}{T^2 \left(1 + \frac{C}{T^2}\right)^{3/2}} \qquad (20)$$

where:

$T=(V^{\frac{1}{2}}/f)t=bt$ $C=S^2/Vf^2$

Consequently the locus signal from the locus determining means 33 follows a curve determined by the equation (20) for a constant value of C, even if the locus parameters (object speed V, shortest distance S and focal length f) are different.

Figure 44:
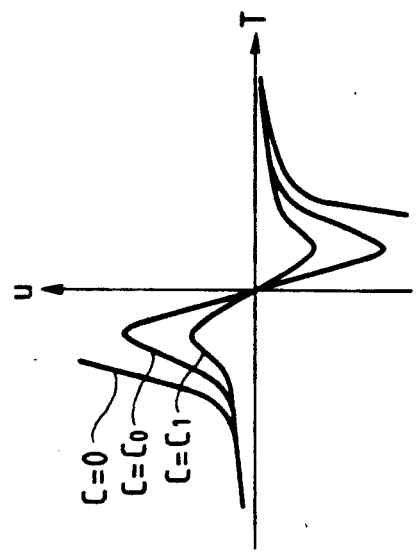
Figure 46:
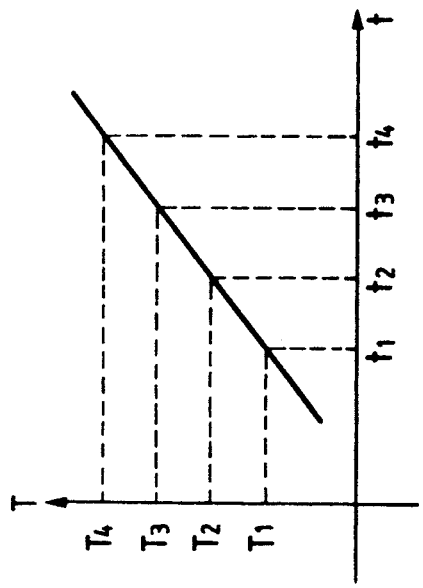

FIG. 44 shows the change in u for different values of C in the equation (20). Since the object locus can be handled by an image equation (20), the prediction means 34 can predict the locus of the object from the equation (20) as long as C is constant or within a predetermined range, even if the locus parameters are different.

Thus the locus signal of the object can be singly determined from the equation (20), by storing a most probable image equation in the locus determining means 33, determining the image plane moving speed u from the past several results of the focus detection means 3, and thereby determining the coefficient b in the equation (20).

In the following there will be explained the process of determination of the locus signal by the locus determining means 33.

As explained above, the object locus parameter setting means 32 stores a constant C corresponding to the locus parameters of a most probable object.

The locus determining means 33 enters the image plane moving speed u, obtained from the defocus amount signals released in succession from the focus detection means 3, into the equation (20) thereby calculating the coefficient b of the equation T=bt. More specifically, the locus determining means 33 calculates the image plane moving speed data $u_n$ according to the equation (21), from the estimated defocus amount $P_n$ indicating the movement of image plane during the calculation of focus detection and the time interval $\Delta t$ thereof, based on the defocus amount signal from the focus detection means 3:

$$u_n = \frac{P_n}{t_n - t_{n-1}} = \frac{P_n}{\Delta t_n} \qquad (21)$$

Figure 45:
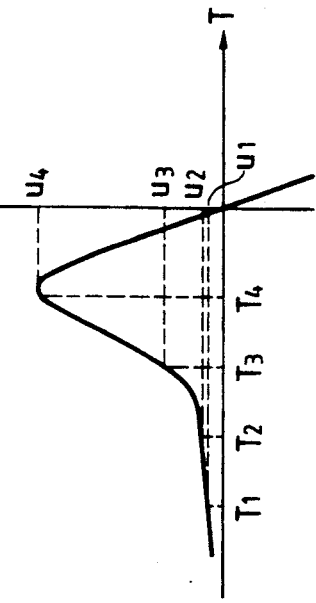

Then the data $T_1, T_2, T_3, \ldots, T_n$ corresponding to the different times as shown in FIG. 45 are determined from the equation (20), based on the plural image plane moving speed data $u_1, u_2, u_3, \ldots, u_n$ calculated in succession by the equation (21).

Finally, the first-order function T=bt is determined from the data $(t_1, T_1), (t_2, T_2), \ldots, (t_n, T_n)$ obtained as explained above.

In general the coefficient b of the first-order function T=bt can be determined for example by the minimum square method. The number of data required is at least two for insertion into the first-order equation mentioned above, and is preferably at least four in consideration of the eventual error in measurement and of a fact that the actual locus, if deviated from the image equation, may become a curve.

As explained above, the locus determining means 33 determines the locus signal representing the object locus (image equation) or the coefficient b, based on the locus parameter signal, related to the constant C, from the object locus parameter setting means 32.

The coefficient b, after being once determined, may remain same thereafter, or may be determined anew in succession. The time t is in general more conveniently calculated by the elapsed time t' from a certain point, than from the point where the object is closest to the camera. Thus the time t can be represented as $t = t' - t_0$ wherein $t_0$ corresponds to the point where the object is closest to the camera. Consequently the desired first-order function is transformed as follows:

$$T = bt' - bt_0 = bt' - a \qquad (22)$$

In this case the locus determining means 33 determines the inclination b and the constant a.

Once these values are determined by the locus determining means 33, the moving locus of the object can be determined singly, so that the future speed can be estimated.

Then the prediction means 34 generates the estimation signal by calculating the predicted image plane moving speed $u_n'$ from the follow equation (23), based on the coefficient b and constant $\alpha$ determined by the locus determining means 33 and the time $t_n$:

$$u_n' = -\text{sign}(t_n' - t_0) \frac{1}{T_n^2 \left(1 + \frac{C}{T_n^2}\right)^{3/2}} \quad (23)$$

wherein $T_n = bt_n' - \alpha$

The estimation signal can be the predicted image plane moving speed $u_n'$ itself calculated by the equation (23), or an estimated defocus amount calculated from said moving speed $u_n'$.

In the following there will be explained the method for discriminating, in the deviation discrimination means 35, whether the signal of the focus detection means 3 representing the latest defocus amount matches the estimation signal from the prediction means 34.

The deviation discrimination means 35 is used for discriminating whether the latest result of focus detection by the focus detection means 3 is significantly deviated from the locus predicted from the preceding results by the prediction means 34. Such deviation is identified if the absolute value of the difference between the predicted image plane moving speed $u_n'$ (representing the predicted defocus amount) obtained from the prediction means 34 and the image plane moving speed $u_n$ (representing the latest defocus amount) obtained from the focus detection means 3 exceeds a predetermined value $u_{exp}$ ($>0$).

The prediction controller 36 calculates the lens drive amount from the predicted defocus amount obtained from the prediction means 34 instead of that obtained from the tracking means 31 in case such deviation is identified by the deviation discrimination means 35, or the predicted defocus amount obtained from the tracking means 31 in case the decision means identifies absence of such deviation.

The lens drive means 37 drives the lens, based on the lens drive amount calculated by the prediction control means 36.

The prediction control means 36 also compares the predicted image plane moving speed $u_{n+1}'$ at the next focus detection calculated by the prediction means 34 with the stored predicted image plane moving speed $u_n'$, and, if said comparison shows a predetermined change, compensates the lens drive amount according to said change. The lens drive means 37 may execute the lens drive based on the compensated lens drive amount calculated by the prediction control means 36. Said predetermined change can for example be a large absolute difference (in case of a large acceleration) or an inversion of sign (in case of the passing of object at the shortest distance).

An example of such compensation will be explained in the following with reference to FIG. 47.

Figure 47:
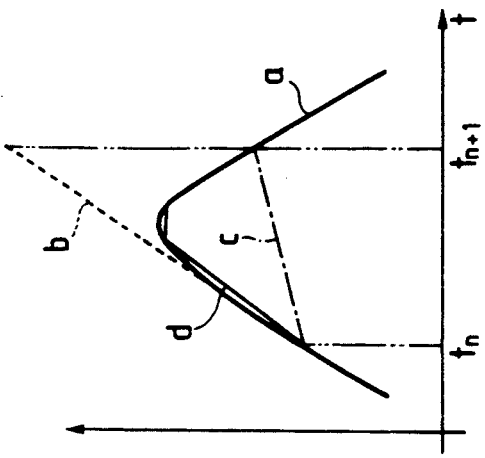

In case of an object providing the movement of an image plane as indicated by a thick solid line a in FIG. 47, the lens drive based on the image plane moving speed at $t_n$ is conducted as indicated by a broken line b, resulting in a large deviation at a time $t_{n+1}$. Consequently, in an automatic focusing device capable of continuously varying the lens driving speed, the lens drive may be conducted by polygonal approximation.

More specifically, the interval between $t_n$ and $t_{n+1}$ is divided in time as indicated by a fine solid line d in FIG. 47, and the lens is driven according to the image plane moving speed at each time. In an automatic focusing device only capable of intermittent lens drive, the lens may be driven as indicated by a chain line c in FIG. 47.

Figure 48:
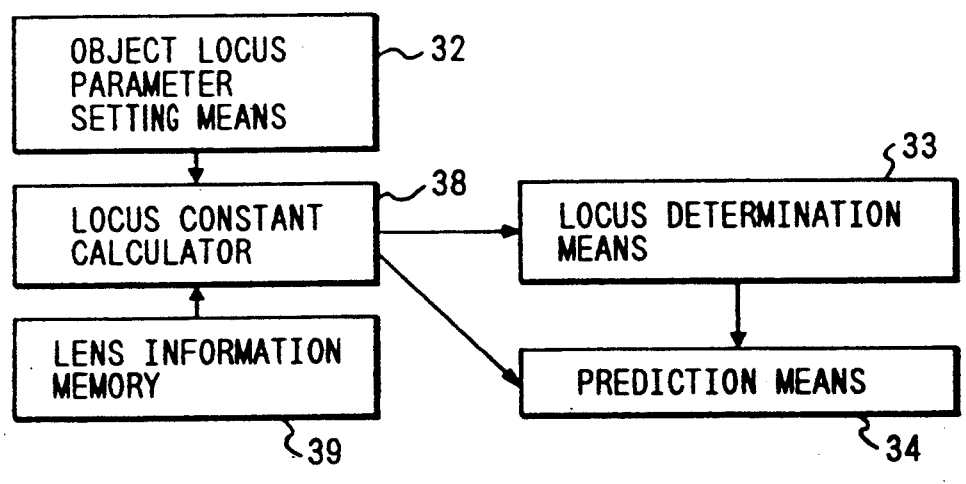
FIG. 48 is a partial block diagram of a tenth embodiment of the present invention.

FIG. 48 shows a tenth embodiment in which the object locus parameter setting means 32 is further refined, but other structures are same as in the ninth embodiment.

In the ninth embodiment, the constant C determining the image equation stored in the object locus parameter setting means 32 is dependent on the focal length, so that a significant deviation from the locus occurs in case a lens with different focal length is mounted. For this reason lens information memory means 39 is provided for storing lens information such as focal length, and the object locus parameter setting means 32 stores a constant E independent from the focal length f as indicated by (29):

$$E = S^2 / V \quad (24).$$

Locus constant calculator means 38 is provided for calculating the constant C determining the image equation according to the following equation (25), from said constant E and the focal length f stored in the lens information memory means 39:

$$C = E/f^2 \quad (25).$$

Then the locus decision means 33 determines the locus signal and the prediction means 34 calculates the estimation signal as in the foregoing embodiment, based on the constant C calculated by the locus constant calculator means 38. In this manner the estimation signal can be exactly obtained for different focal lengths from a same constant E.

Figure 49:
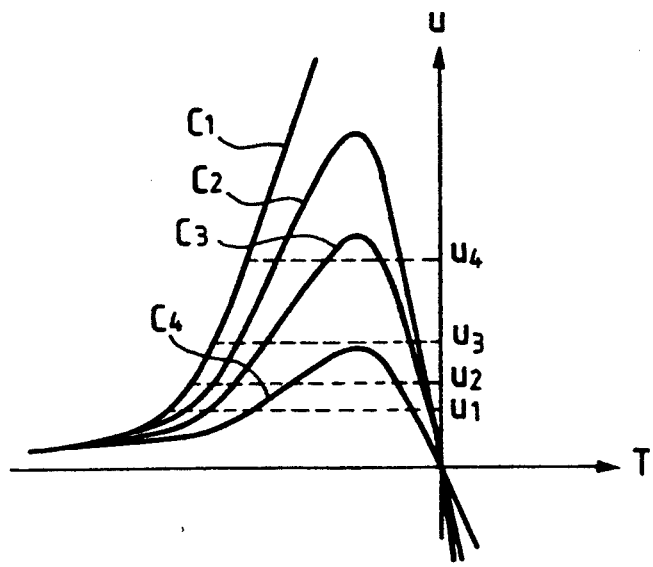

In the following there will be explained an eleventh embodiment, with reference to FIGS. 49 and 50.

The ninth embodiment is unable to provide a satisfactory result if the actual locus is significantly different from the image equation stored in the locus determining means 33. In the 11th embodiment, therefore, the object locus parameter setting means 32 stores plural sets of locus parameters, and the locus determining means 33 determines the most appropriate locus based on said parameters.

The 11th embodiment is different from the 9th embodiment only in the object locus parameter setting means 32 and the locus determining means 33, which will therefore be explained in the following. For the purpose of simplicity there will be explained a case of utilizing four representative image equations.

The object locus parameter setting means 32 stores constants $C_i$, (i=1, 2, 3, 4) for determining the image equation. Then the locus determining means 33 selects the most appropriate one of four functions represented by four image equations shown in FIG. 49, based on the image plane moving speed $u_n$ corresponding to the defocus amount output from the focus detection means 3 and the stored constant C.

At first the locus determining means 33 calculates the time $T_{(1,n)}$ by the equation (23) from the stored constant C1 and the $u_n$ calculated by the focus detection means 3.

Thereafter the converted times $T_{(i,n)}$ are calculated for the other constants $C_i$.

Figure 50:
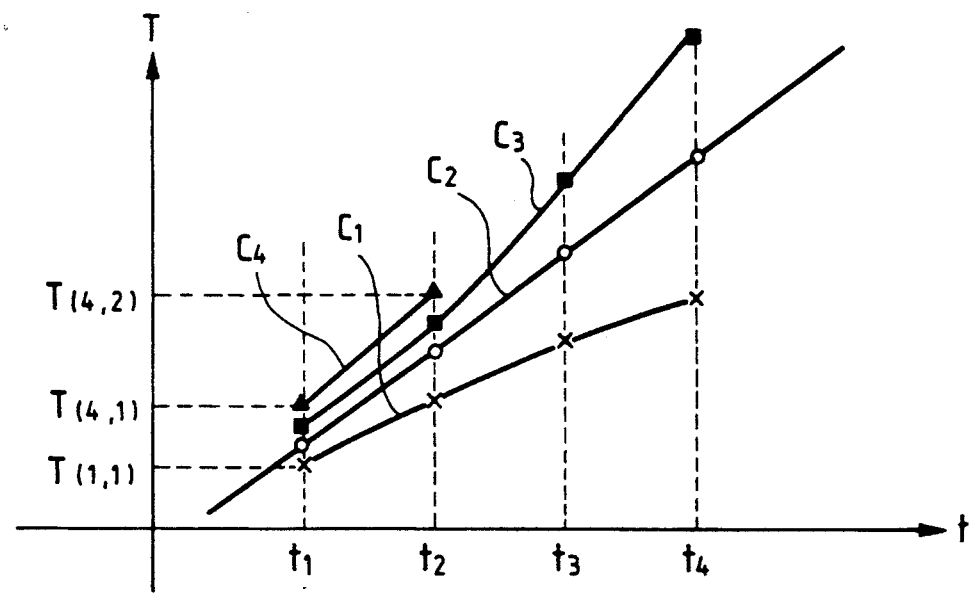

FIG. 50 shows an example of the obtained results. Then the locus determining means 33 calculates a first-order regression line from the set $(t_1, T_{(i,l)}), (t_2, T_{(i,2)}), \ldots, (t_n, T_{(i,n)})$, and calculates a value $\sigma_1$ indicating the level of coincidence of the locus function determined by the values $b_1$ and $a_1$ with a linear line.

The value $\sigma_1$ indicating the coincidence with a linear line may be calculated by a satistical method such as the sum of squared differences, or may be represented by the second-order coefficient in case the locus function is obtained as a second-order function. The locus determining means 33 selects, based on said value $\sigma_1$, an image equation best matching the linear line, among the plural image equations determined by the constants $C_i$, and selects the values $b_i$, $a_1$ and $C_i$ of such selected image equation as b, a and C.

For example, in a case as shown in FIG. 50, in which an image equation with $i=2$ is closest to the linear line, there are selected $b=b_2$, $a=a_2$ and $C=C_2$ and the locus determining means 33 sends a locus signal related to $b_2$, $a_2$ to the prediction means 34, while the object locus parameter setting means 32 sends a locus parameter signal relating to the constant $C_2$ to the prediction means 34.

In the following a 12th embodiment will be explained with reference to FIG. 51.

Figure 51:
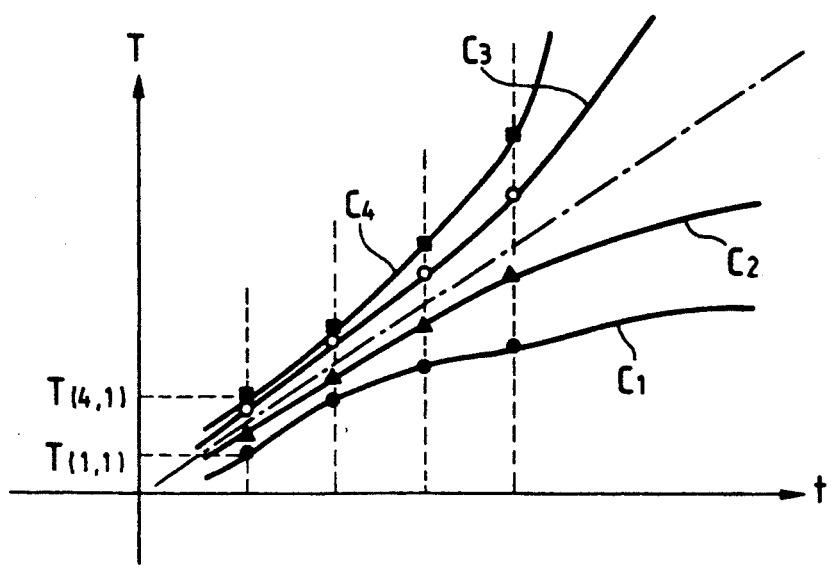
FIG. 51 is a chart showing movement loci in a twelfth embodiment of the present invention.

The 11th embodiment is unable to provide a satisfactory result if the time t is correlated with the converted time T according to the equation (23) as shown in FIG. 51. Consequently the 12th embodiment effects suitable interpolation on the values b, a calculated by the locus determining means 33.

At first the locus determining means 33 calculates the times $T_{(i,n)}$ from the four image equations (23) determined by the constants $C_i$ ($i=1-4$), and determines, by the values $\sigma_i$, a section in which the true value is considered to be present. In case of FIG. 51, the true value (linear line indicated by a chain line) is considered to be present between $C_2$ and $C_3$.

Thus the true values b, a, C are obtained by the following weighted averages:

$$\left. \begin{array}{l} b = \dfrac{W(\sigma_2)b_2 + W(\sigma_3)b_3}{W(\sigma_2) + W(\sigma_3)} \\ a = \dfrac{W(\sigma_2)a_2 + W(\sigma_3)a_3}{W(\sigma_2) + W(\sigma_3)} \\ C = \dfrac{W(\sigma_2)C_2 + W(\sigma_3)C_3}{W(\sigma_2) + W(\sigma_3)} \end{array} \right\} \quad (26)$$

wherein $W(\sigma)$ is a weighting function.

Thus the estimation means 34 can determine the predicted locus more exactly, by determining the values b, a constituting the locus signal of the locus determining means 33, and the constant C determining the image equation and constituting the locus parameter signal of the object locus parameter setting means 32.

Figure 52:
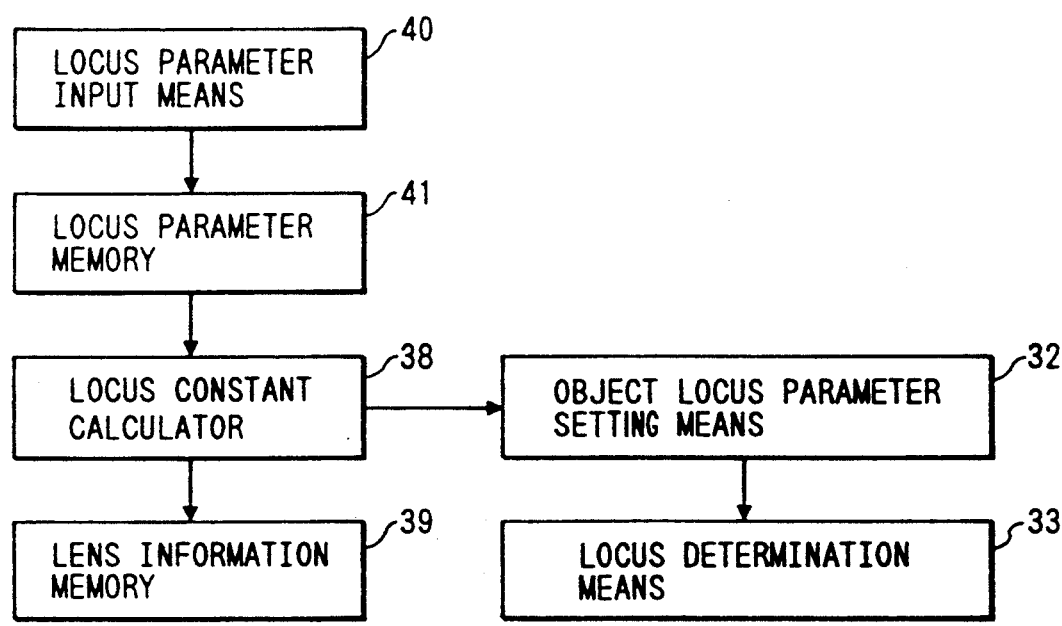
FIG. 52 is a partial block diagram of a thirteenth embodiment of the present invention.

In the following there will be explained a 13th embodiment with reference to FIG. 52.

In the 13th embodiment, in response to the externally entered locus parameters, the object locus parameter setting means 32 calculates the constant C for determining the image equation, based on which the locus determining means 33 determines the object locus. Other structures are same as in the 9th embodiment.

Locus parameter input means 40 serves for externally entering the object speed V and the shortest distance S, which are memorized in locus parameter memory means 41. Lens information memory means 39 stores the lens information, such as the focal length. Locus constant calculator means 38 calculates the constant C determining the image equation according to the equation (20), based on the object speed V and distance S stored in the locus parameter memory means 41 and the focal length f stored in the lens information memory means 39. Said constant C is stored in the object locus parameter setting means 32. Thus the locus determining means 33 determines the locus signal based on said constant C stored in said setting means 32.

As exact values of the object speed V and the distance S cannot be entered in practice, the locus signal can be generated by determining plural constants $C_i$ from the stored locus parameters in the vicinity of the constant C, and selecting an image equation, by the locus determining means 33, defined by a most appropriate constant $C_j$.

The operation of the locus parameter input means 40 can be simplified if it is so designed to select one of plural predetermined values, instead of direct entry of the parameters.

Figure 53:
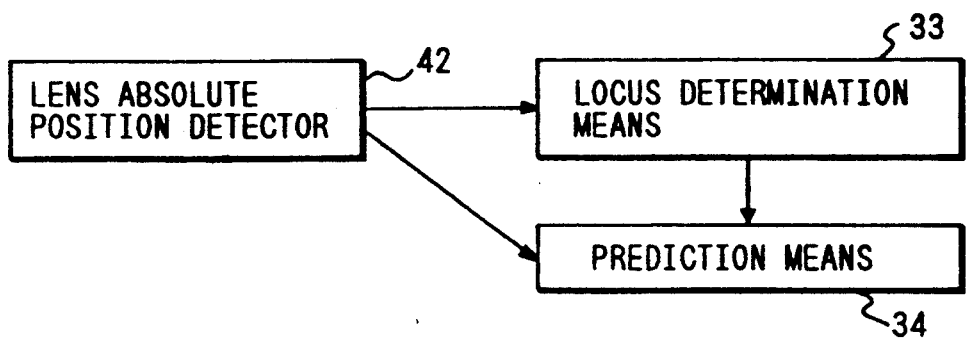
FIG. 53 is a partial block diagram of a fourteenth embodiment of the present invention.

In the following there will be explained a 14th embodiment with reference to FIG. 53.

In the 9th embodiment, the locus determining means 33 determines the image equation for the object locus with respect to the image plane moving speed, but the structure can be further simplified if the shifting amount of the lens can be detected.

The equations (15) and (16) can be transformed to the following equation (27) representing $1/x^2$:

$$\frac{1}{x^2} = \frac{l^2}{f^2} = \frac{V^2 t^2 + S^2}{f^2} \quad (27)$$

The following equation (28) is obtained by rewriting the time t by the elapsed time t' from a certain point:

$$\frac{1}{x^2} = \frac{V^2(t' - t_0)^2 + S^2}{f^2} \quad (28)$$

This equation can be generally rewritten as:

$$\frac{1}{x^2} = At'^2 + Bt' + C \quad (29)$$

wherein:

$$A = \frac{V^2}{f^2}, \quad B = -\frac{2V^2 t_0}{f^2}, \quad C = \frac{V^2 t_0}{f^2} + \frac{S^2}{f^2}$$

Consequently the locus can be determined singly if the lens shifting amount and the time are known. The lens shifting amount $x_n$ is represented by the sum of the lens absolute position $L_n$ at the focus detection and the defocus amount $DF_n$, namely $x_n = L_n + DF_n$.

The object locus parameter setting means 32 stores the equation (29). Absolute lens position detector means 42 detects the absolute distance of the phototaking lens, from a position thereof focused to the infinite distance. Said detector means 42 may be composed of an encoder fixed in the lens.

Then the locus determining means 33 calculates the lens shifting amount $x_n$ based on the outputs of the focus detection means 3 and the absolute lens position detector means 42, and determines the coefficients A, B, C utilizing the minimum square method based on the equation (29) stored in the object locus parameter setting means 32, and based on $1/x_n$ and $t_n$.

Then the prediction means 34 calculates the lens shifting amount $x_{n-1}'$, $x_n'$ according to the equation (29) based on the locus signal, relating to said coefficients A, B, C determined by the locus determining means 33, and determines the predicted defocus amount by the following equation (30):

$$P_n = x_n' - x_{n-1}' \quad (30)$$

Deviation discrimination means 35, for discriminating whether the latest result from the focus detection means 3 is significantly deviated from the predicted locus signal obtained as the preceding result of the prediction means 34, identifies such deviation when the following condition (31) is met:

$$|x_n' - x_n| > x_{exp} \quad (31)$$

wherein:

$x_n'$: lens shifting amount calculated from predicted locus $x_n$: lens shifting amount at latest focus detection $x_{exp}$: predetermined value (>0)

The predetermined value $x_{exp}$ is preferably comparable to or slightly larger than the defocus range defined as in-focus state (in general 50–150 μm). Also said predetermined value $x_{exp}$ may be varied depending on the predicted defocus amount $P_n$, for example being made larger for a larger predicted defocus amount. Also the discrimination may naturally be made by the predicted defocus amount $P_n$ as in the 9th embodiment.

The present embodiment can easily track the object even when the image plane moving speed varies suddenly, because the lens shifting amount can be directly determined.

The lens drive based on the predicted locus signal may be conducted by another method. For example the lens drive may be conducted by a predicted locus signal calculated at an interval shorter than the interval of the focus detections. This method serves to simplify the lens drive, since the lens shifting amount is directly determined, whereby the relationship between the lens position and the image plane position is not needed. In case the object approaches with a constant speed, the lens shifting amount increases in proportion to $1/(\text{time})^2$ even if a deviated state is not identified by the deviation discrimination means 35, as will be apparent from the equation (28).

Consequently, even if the lens drive is conducted according to the latest result of the focus detection means 3, there will result a large defocus amount at the next focus detection. Therefore, on the assumption that the next focus detection is conducted after $\Delta T$ (interval of focus detections does not change suddenly in general) based on the equation (29), the next lens shifting amount $x_{n+1}$ is calculated as follows:

$$\frac{1}{x_{n+1}^2} = \frac{1}{x_n^2} + (2At + B)\Delta t + A \Delta t^2$$

Taking $E = (2At + B)\Delta t + A\Delta t^2$, this equation can be rewritten as follows:

$$\frac{1}{x_{n+1}^2} = \frac{1}{x_n^2} + E$$

Thus the compensation may be added if E is equal to or larger than a predetermined value, but be excluded if E is less than said predetermined value.

In the foregoing 9th to 14th embodiments, the tracking means generates a tracking signal of the predicted amount of movement, by predicting the object movement based on the results of past plural focus detections, while a predicted movement signal is generated from a locus function which represents the moving locus of the object and is determined by the prediction means based on the information on object movement and on the focus detection signal. The lens drive is conducted either according to said tracking signal or said predicted movement signal, based on the discrimination by the deviation discrimination means.

Thus the phototaking lens is driven based on the predicted locus function when the latest focus detection signal is deviated by at least a predetermined value from the locus function of the predicted locus of the object. Consequently the phototaking lens can always be maintained at the proper in-focus position and can provide a satisfactory photograph, even when the focus detection is influenced by an object passing in front of the focus detecting device of the camera or when the camera is temporarily shifted from the desired object. On the other hand, when the latest focus detection signal is not deviated by the predetermined value from the predicted locus function, the phototaking lens is driven according to the tracking signal obtained by the tracking means instead of according the locus function. Such lens drive based on the tracking signal, in comparison with that based on the locus function, allows more exact tracking and better focusing even for an object showing delicate movement.

Also said 9th to 14th embodiments are capable of predicting the future lens drive from the locus function, so that the lens overrun can be prevented even when the driving direction of lens is inverted.

What is claimed is:

1. An automatic focus device for a camera, comprising:

a phototaking lens for forming an image of an object on a predetermined plane;

focus detection means for detecting the amount of defocus of an image plane of said phototaking lens with respect to said predetermined plane;

lens position detecting means for detecting the position of said phototaking lens;

in-focus lens position determining means for determining an in-focus lens position to which said phototaking lens is to be focused, based on said defocus amount and the detected lens position;

lens movement pattern memory means for storing, as lens movement pattern information, the relationship between the lens position and time for focusing said phototaking lens to a particular moving object; and lens drive controller means for controlling the lens position in such a manner that the movement of said phototaking lens as a function of time coincides with the lens movement pattern information, and for compensating error between the position-time relationship of said phototaking lens and said lens movement pattern information, based on the in-focus lens position.

2. An automatic focusing device according to claim 1, wherein said lens drive controller means is adapted to read, with the lapse of time, said lens movement pattern information from an initial position corresponding to an initially obtained in-focus lens position, and to effect lens position control in such a manner that the actual lens position conforms to the information read, and, in case a new in-focus lens position is obtained in the course of said control, to correct the lens position of said lens movement pattern information to said new in-focus lens position and to re-start the reading of said lens movement pattern information from said new position.

3. An automatic focusing device according to claim 1, further comprising:
   lens movement pattern setting means for externally setting said lens movement pattern information.

4. An automatic focusing device according to claim 1, further comprising:
   memory controller means having a lens movement pattern drive mode and a lens movement pattern memory mode.

5. An automatic focusing device according to claim 4, wherein said memory controller means is adapted, in said lens movement pattern memory mode, to store the relationship between the in-focus lens position and time as the lens movement pattern in the lens movement pattern memory means.

6. An automatic focusing device according to claim 1, wherein said lens movement pattern memory means is adapted to proportionally compress or expand the lens movement pattern information along with respect to time, based on plural in-focus lens positions and intervals thereof.

7. An automatic focusing device according to claim 1, wherein said lens movement pattern information has plural values in time for a lens position, and said lens drive controller means is adapted to select first the smaller value in time of said lens movement pattern information.

8. An automatic focusing device according to claim 1, wherein said lens drive controller means comprises starter means for instructing the start of lens drive control coinciding with said lens movement pattern.

9. An automatic focusing device for a camera, comprising:
   a phototaking lens for forming an image of an object on a predetermined plane;
   focus detecting means for detecting the amount of defocus of an image plane of said phototaking lens with respect to said predetermined plane;
   lens position detecting means for detecting the position of said phototaking lens;
   in-focus lens position determining means for intermittently determining an in-focus lens position to which said phototaking lens is to be focused, based on said defocus amount and the detected lens position;
   in-focus position memory means for storing plural in-focus lens positions and times generated time-sequentially;
   lens movement pattern memory means for storing, as lens movement pattern information, the relationship between the lens position and time for focusing said phototaking lens to a particular moving object;
   lens movement pattern compensating means for compensating said lens movement pattern information and generating compensated lens movement pattern information having reduced error relative to the in-focus lens position determined by said in-focus lens position determining means; and
   lens drive controller means for effecting drive control of said phototaking lens according to said compensated lens movement pattern information.

10. An automatic focusing device according to claim 9, wherein said lens drive controller means is adapted to effect the drive control of said phototaking lens according to the compensated lens movement pattern information of a preceding time, when said in-focus lens position determining means is incapable of determining a current in-focus lens position.

11. An automatic focusing device according to claim 9, wherein said lens drive controller means is adapted to effect the drive control of said phototaking lens according to the compensated lens movement pattern information of a preceding time, when a current in-focus lens position determined by said in-focus lens position determining means shows a sudden change.

12. An automatic focusing device according to claim 9, wherein said lens movement pattern compensating means is adapted to generate a signal indicating an error between said compensated lens movement pattern information and said in-focus lens position, and said device further comprises drive inhibiting means for inhibiting the drive control of said phototaking lens by said lens drive controller means according to the compensated lens movement pattern information, when said error signal is equal to or larger than a predetermined value.

13. An automatic focusing device according to claim 12, wherein said lens drive controller means is adapted to effect the drive control of said phototaking lens according to said in-focus lens position, when said error signal is equal to or larger than a predetermined value.

14. An automatic focusing device according to claim 12, wherein said lens movement pattern compensating means is adapted to generate a compensation amount signal for the compensated lens movement pattern information, and said drive inhibiting means is adapted to inhibit the drive control of said phototaking lens by said lens drive controller means when said compensation amount signal is equal to or larger than a predetermined value.

15. An automatic focusing device according to claim 9, further comprising:
   plural lens movement pattern memory means and selector means;
   wherein said lens movement pattern compensating means is adapted to generate an error signal indicating an error between the lens movement pattern information stored in each of said plural lens movement pattern memory means and the in-focus lens position determined by said in-focus lens position determining means; and
   said selector means is adapted to select a compensated lens movement pattern corresponding to a minimum error indicated by said error signals.

16. An automatic focusing device according to claim 9, wherein said lens movement pattern compensating means is adapted to generate the compensated lens movement pattern information by applying proportional expansion or compression and parallel displacement in lens position and in time to the lens movement pattern information.

17. An automatic focusing device according to claim 9, wherein said lens movement pattern compensating means is adapted to generate the compensated lens movement pattern information by compensating said lens movement pattern information in such a manner as to reduce errors with respect to the in-focus lens positions within a predetermined past period or with respect to a predetermined number of past in-focus lens positions.

18. An automatic focusing device for a camera, comprising:
   a phototaking lens for forming an image of an object on a predetermined plane;
   focus detecting means for detecting the amount of defocus of an image plane of said phototaking lens with respect to said predetermined plane;
   lens position detecting means for detecting the position of said phototaking lens;
   in-focus lens position determining means for determining an in-focus lens position to which said phototaking lens is to be focused, based on said defocus amount and said lens position;
   lens movement pattern memory means for determining and storing lens movement pattern information indicating a relationship between the lens position and time for focusing said phototaking lens to a particular moving object, based on plural in-focus lens positions and times generated time-sequentially; and
   lens drive controller means for effecting drive control of said phototaking lens based on said lens movement pattern information.

19. An automatic focusing device according to claim 18, further comprising:
   plural in-focus position memory means for storing plural in-focus lens positions and times generated time-sequentially; and
   lens movement pattern calculating means for determining lens movement pattern information indicating the relationship between lens position and time for focusing said phototaking lens to a particular moving object, based on the in-focus lens positions and times stored in said plural in-focus position memory means;
   wherein said lens movement pattern memory means is adapted to store the determined lens movement pattern information.

20. An automatic focusing device according to claim 19, further comprising:
   mode selector means for selecting either an operation mode for storing, in said in-focus position memory means, the plural in-focus lens positions and times generated time-sequentially, or an operation mode for effecting the drive control of said phototaking lens by said lens drive controller means according to the determined lens movement pattern information.

21. An automatic focusing device according to claim 19, further comprising memory selector means for selecting one of said plural in-focus position memory means.

22. An automatic focusing device according to claim 19, further comprising memory controller means for controlling whether or not to store, in said plural in-focus position memory means, the plural in-focus lens positions and times.

23. An automatic focusing device according to claim 21, further comprising display means for displaying the content of the in-focus position memory means selected by said memory selector means.

24. An automatic focusing device for a camera, comprising:
   a phototaking lens for forming an image of an object on a predetermined plane;
   focus detecting means for detecting the amount of defocus of an image plane of said phototaking lens with respect to said predetermined plane;
   tracking means for generating a tracking signal indicating predicted movement of the object based on plural past defocus amounts;
   movement pattern determining means for determining a function representing a movement pattern of the object, based on information relating to the object movement and on said defocus amount;
   prediction means for generating a signal representing predicted movement of the object according to said function;
   deviation discrimination means for discriminating whether the latest defocus amount obtained by said focus detecting means is deviated from the movement represented by the predicted movement signal generated by said prediction means;
   prediction controller means for calculating a drive amount of said phototaking lens either based on said predicted movement signal when a deviated state is identified by said deviation discrimination means, or on said tracking signal when a non-deviated state is identified; and
   lens drive means for driving said phototaking lens according to said lens drive amount.

25. An automatic focusing device according to claim 24, wherein said prediction controller means is adapted to calculate predicted image plane moving speed at present time and at a succeeding time, based on said function, and, in case of a predetermined change in said speeds, to calculate a compensated lens drive amount from said lens drive amount, and wherein said lens drive means is adapted to drive said phototaking lens according to said compensated lens driver amount.

26. An automatic focusing device according to claim 24, further comprising:
   object movement pattern parameter setting means for storing information relating to movements of plural objects; and
   wherein said movement pattern determining means is adapted to determine the movement pattern by determining said functions on the image plane moving speed based on plural information stored in said object movement pattern parameter setting means, and selecting one function best matching the object imaged by said phototaking lens.

27. An automatic focusing device according to claim 24, further comprising:
   lens information memory means for storing focal length information relating to the phototaking lens;
   object movement pattern parameter setting means for storing a constant relating to the object movement but independent of focal length of the phototaking lens; and
   movement pattern constant calculating means for calculating, from the focal length information of said lens information memory means and said constant, a constant representing the movement pattern for supply to said movement pattern determining means.

28. An automatic focusing device according to claim 26, further comprising:
lens information memory means for storing information relating to the phototaking lens;
movement pattern parameter input means for external entry of parameters relating to the object movement;
movement pattern parameter memory means for storing the parameters thus entered; and
movement pattern constant calculating means for calculating a constant relating to the object movement pattern, based on the lens information in said lens information memory means and the stored parameters in said movement pattern parameter memory means;
wherein said object movement pattern parameter memory means is adapted to store the constant calculated by said movement pattern constant calculating means.

29. An automatic focusing device according to claim 26, wherein said object movement pattern parameter setting means is adapted to set a function representing the squared reciprocal of a shifting amount of the phototaking lens as the function relating to the movement pattern of the object.

30. An automatic focus device for a camera, comprising:
a phototaking lens for forming an image of an object on a predetermined plane;
focus detection means for detecting the amount of defocus of an image plane of said phototaking lens with respect to said predetermined plane;
lens movement pattern memory means for storing, as lens movement pattern information, the relationship between the lens position and time for focusing said phototaking lens to a particular moving object;
means for modifying the relationship between the lens position and time of the stored lens movement pattern information on the basis of the amount of defocus detected by said focus detection means during driving of said phototaking lens; and
lens drive controller means for controlling the driving of said phototaking lens according to the modified relationship between the lens position and time.

* * * * *